US010653993B2

(12) United States Patent
Dinca et al.

(10) Patent No.: US 10,653,993 B2
(45) Date of Patent: May 19, 2020

(54) COMPOSITIONS COMPRISING METAL ORGANIC FRAMEWORKS FOR THE UPTAKE OF COMPOUNDS AND RELATED METHODS

(71) Applicant: Massachusetts Institute of Technology, Cambridge, MA (US)

(72) Inventors: Mircea Dinca, Somerville, MA (US); Adam J. Rieth, Somerville, MA (US); Yuri Tulchinsky, Boston, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 145 days.

(21) Appl. No.: 15/607,255

(22) Filed: May 26, 2017

(65) Prior Publication Data

US 2017/0341010 A1    Nov. 30, 2017

Related U.S. Application Data

(60) Provisional application No. 62/441,024, filed on Dec. 30, 2016, provisional application No. 62/342,719, filed on May 27, 2016.

(51) Int. Cl.
*B01D 53/04* (2006.01)
*C07F 15/06* (2006.01)
(Continued)

(52) U.S. Cl.
CPC ............. *B01D 53/04* (2013.01); *B01D 53/02* (2013.01); *B01J 20/226* (2013.01);
(Continued)

(58) Field of Classification Search
CPC .................... B01D 53/02; B01D 53/04; B01D 2259/4525; B01D 2259/4541;
(Continued)

(56) References Cited

U.S. PATENT DOCUMENTS 5,112,974 A    5/1992   Barton
6,893,564 B2   5/2005   Mueller et al.
(Continued)

FOREIGN PATENT DOCUMENTS

CN        104001476 B    5/2016
WO    WO 2014/182648 A1    11/2014
(Continued)

OTHER PUBLICATIONS

Abbenhuis, Heterogenization of Metallocene Catalysts for Alkene Polymerization. Angew. Chem. Int. Ed. 1999;38(8):1058-60.
(Continued)

*Primary Examiner* — Philip Y Louie
*Assistant Examiner* — Jason Y Chong
(74) *Attorney, Agent, or Firm* — Wolf, Greenfield & Sacks, P.C.

(57) ABSTRACT

Compositions and methods for adsorption of a species (e.g., ammonia, water, a halogen) comprising metal organic frameworks (MOFs) are generally provided. In some embodiments, a MOF comprises a plurality of metal ions, each coordinated with at least one ligand comprising at least two unsaturated N-heterocyclic aromatic groups arranged about an organic core.

11 Claims, 13 Drawing Sheets

(51) Int. Cl.
*B01D 53/02* (2006.01)
*B01J 20/22* (2006.01)
*B01J 20/34* (2006.01)
*C07F 13/00* (2006.01)

(52) U.S. Cl.
CPC ........... *B01J 20/3425* (2013.01); *C07F 13/00* (2013.01); *C07F 15/065* (2013.01); *B01D 2253/204* (2013.01); *B01D 2257/202* (2013.01); *B01D 2257/2022* (2013.01); *B01D 2257/406* (2013.01); *B01D 2257/80* (2013.01); *B01D 2258/06* (2013.01); *B01D 2259/4525* (2013.01); *B01D 2259/4541* (2013.01)

(58) Field of Classification Search
CPC .......... B01D 2258/06; B01D 2257/202; B01D 2257/2022; B01D 2257/406; B01D 2257/80; B01D 2253/204; C07F 15/065; C07F 13/00; B01J 20/226; B01J 20/3425
See application file for complete search history.

(56) References Cited

U.S. PATENT DOCUMENTS

| | | | |
|---|---|---|---|
| 7,215,473 | B2 | 5/2007 | Fleming |
| 7,662,746 | B2* | 2/2010 | Yaghi .................. B01J 20/0237 502/401 |
| 8,197,579 | B2 | 6/2012 | Miller |
| 8,372,779 | B2 | 2/2013 | Schubert et al. |
| 8,764,887 | B2 | 7/2014 | Dinca et al. |
| 9,758,532 | B2 | 9/2017 | Dinca et al. |
| 10,174,063 | B2 | 1/2019 | Dinca et al. |
| 2001/0003950 | A1 | 6/2001 | Zhang et al. |
| 2007/0171107 | A1 | 7/2007 | Wang |
| 2008/0188677 | A1 | 8/2008 | Schubert et al. |
| 2008/0306315 | A1 | 12/2008 | Lillerud et al. |
| 2009/0221418 | A1 | 9/2009 | Fischer et al. |
| 2010/0197990 | A1 | 8/2010 | Schubert et al. |
| 2010/0322837 | A1 | 12/2010 | Miller |
| 2011/0137100 | A1 | 6/2011 | Toulhoat et al. |
| 2011/0294658 | A1 | 12/2011 | Lefevre et al. |
| 2012/0077667 | A1 | 3/2012 | Liu et al. |
| 2012/0141685 | A1 | 6/2012 | Gaab et al. |
| 2013/0066128 | A1 | 3/2013 | Breuil et al. |
| 2013/0152789 | A1 | 6/2013 | Polshettiwar et al. |
| 2013/0204025 | A1 | 8/2013 | Buso et al. |
| 2014/0012039 | A1 | 1/2014 | Yaghi et al. |
| 2014/0326007 | A1* | 11/2014 | Dinca ........................ C07F 3/06 62/112 |
| 2015/0047505 | A1 | 2/2015 | Schroder et al. |
| 2016/0046738 | A1 | 2/2016 | Farha et al. |
| 2016/0102040 | A1 | 4/2016 | Allen et al. |
| 2017/0073364 | A1 | 3/2017 | Dinca et al. |
| 2018/0250664 | A1 | 9/2018 | Dinca et al. |
| 2018/0251581 | A1 | 9/2018 | Dinca et al. |
| 2019/0054446 | A1* | 2/2019 | Long .................... B01J 20/3483 |
| 2019/0211043 | A1 | 7/2019 | Dinca et al. |

FOREIGN PATENT DOCUMENTS

| | | |
|---|---|---|
| WO | WO 2015/142954 A1 | 9/2015 |
| WO | WO 2015/171791 A1 | 11/2015 |
| WO | WO 2017/048787 A1 | 3/2017 |
| WO | WO 2017/048795 A1 | 3/2017 |
| WO | WO 2018/067636 A1 | 4/2018 |

OTHER PUBLICATIONS

Achmann et al., Metal-Organic Frameworks for Sensing Applications in the Gas Phase. Sensors. 2009;9(3):1574-89. Epub Mar. 6, 2009.
Akiyama et al., Effect of functional groups in MIL-101 on water sorption behavior. Microporous and Mesoporous Materials. 2012;157:89-93.
Alarco-Padilla et al., Application of absorption heat pumps to multi-effect distillation: a case study of solar desalination. Desalination. Jun. 25, 2007;212:294-302.
Al-Sa'Doun, Dimerization of ethylene to butene-1 catalyzed by Ti(OR')4-AlR3. Applied Catalysis A. Nov. 2, 1993;105(1):1-40.
Askalany et al., An overview on adsorption pairs for cooling. Renewable and Sustainable Energy Reviews. Mar. 2013;19:565-72.
Baier et al., Post-Metallocenes in the Industrial Production of Polyolefins. Ange. Chemie Int. Ed. Sep. 8, 2014;53(37):9722-44.
Bellarosa et al. When the Solvent Locks the Cage: Theoretical Insight into the Transmetalation of MOF-5 Lattices and Its Kinetic Limitations. Chem. Mater. 2015;27(9):3422-9. Epub Apr. 13, 2015.
Bertrand et al., Thiophene-based covalent organic frameworks. PNAS. Mar. 26, 2013;110(13):4923-8. Epub Mar. 11, 2013.
Biswas et al., A cubic coordination framework constructed from benzobistriazolate ligands and zinc ions having selective gas sorption properties. Dalton Trans. 2009:6487-95. Epub Jun. 29, 2009.
Biswas et al., Homo- and Heteropentanuclear Coordination Compounds with Td Symmetry—the Solid State Structures of [MZn4(L)4(L')6] (M=CoII or Zn; L=chloride or acac; L'=1,2,3-benzotriazolate). Z. Anorg. Allg. Chem. Oct. 2008;634(14):2532-8.
Biswas et al., Syntheses and Magnetostructural Investigations on Kuratowski-Type Homo- and Heteropentanuclear Coordination Compounds [MZn4Cl4(L)6] (MII=Zn, Fe, Co, Ni, or Cu; L=5,6-Dimethyl-1,2,3-benzotriazolate) Represented by the Nonplanar K3,3 Graph. Inorg. Chem. 2010;49(16):7424-34. Epub Jul. 16, 2010.
Bonaccorsi et al., Hydrothermal and microwave synthesis of SAPO (CHA) zeolites on aluminum foams for heat pumping applications. Microporous and Mesoporous Mater. 2013;167:30-37.
Boudjouk et al., Solvated and Unsolvated Anhydrous Metal Chlorides from Metal Chloride Hydrates. Inorg. Synth. 1992;29:108-11.
Brozek et al., Cation exchange at the secondary building units of metal-organic frameworks. Chem. Soc. Rev. 2014;43:5456-67. Epub May 16, 2014.
Brozek et al., Dynamic DMF Binding in MOF-5 Enables the Formation of Metastable Cobalt-Substituted MOF-5 Analogues. ACS Cent. Sci. 2015;1(5):252-60. Epub Jul. 29, 2015.
Brozek et al., Lattice-imposed geometry in metal-organic frameworks: lacunary Zn4O clusters in MOF-5 serve as tripodal chelating ligands for Ni2+. Chemical Science. 2012;3:2110-3. Epub Apr. 4, 2012.
Brozek et al., NO Disproportionation at a Mononuclear Site-Isolated Fe2+ Center in Fe2+-MOF-5. J. Am. Chem. Soc. 2015;137(23):7495-501. Epub May 19, 2015.
Brozek et al., Solvent-Dependent Cation Exchange in Metal-Organic Frameworks. Chem. Eur. J. Jun. 2, 2014;20(23):6871-4.
Brozek et al., Ti3+-, V2+/3+-, Cr2+/3+-, Mn2+-, and Fe2+-Substituted MOF-5 and Redox Reactivity in Cr- and Fe-MOF-5. J. Am. Chem. Soc. 2013;135(34):12886-91. Epub Jul. 31, 2013.
Cadiau et al., Design of Hydrophilic Metal Organic Framework Water Adsorbents for Heat Reallocation. Adv. Mater. 2015;27:4775-80. Epub Aug. 26, 2015.
Campbell et al., Chemiresistive Sensor Arrays from Conductive 2D Metal-Organic Frameworks. J. Am. Chem. Soc. 2015;137(43):13780-3. Epub Oct. 11, 2015.
Campbell et al., Cu3(hexaiminotriphenylene)2: An Electrically Conductive 2D Metal-Organic Framework for Chemiresistive Sensing. Angewandte Chemie Int Ed. Mar. 27, 2015;54(14):4349-52. Epub Feb. 9, 2015.
Canivet et al., MOF-Supported Selective Ethylene Dimerization Single-Site Catalysts through One-Pot Postsynthetic Modification. J. Am. Chem. Soc. 2013;135:4195-8. Epub Mar. 7, 2013.
Canivet et al., Structure-property relationships of water adsorption in metal-organic frameworks. New J. Chem. 2014;38:3102-11. Epub Apr. 16, 2014.
Canivet et al., Water adsorption in MOFs: fundamentals and applications. Chem. Soc. Rev. 2014;43:5594-617. Epub May 29, 2014.
Caskey et al., Dramatic tuning of carbon dioxide uptake via metal substitution in a coordination polymer with cylindrical pores. J Am Chem Soc. Aug. 20, 2008;130(33):10870-1. doi: 10.1021/ja8036096. Epub Jul. 29, 2008.
Chen et al., Noncovalently Netted, Photoconductive Sheets with Extremely High Carrier Mobility and Conduction Anisotropy from

(56) References Cited

OTHER PUBLICATIONS

Triphenylene-Fused Metal Trigon Conjugates. J Am Chem Soc. 2009;131(21):7287-92. Epub May 4, 2009.
Chmiola et al., Anomalous Increase in Carbon Capacitance at Pore Sizes Less Than 1 Nanometer. Science. Sep. 22, 2006;313(5794):1760-3.
Chmiola et al., Desolvation of Ions in Subnanometer Pores and Its Effect on Capacitance and Double-Layer Theory. Angew. Chem. Int. Ed. Apr. 21, 2008;47(18):3392-5.
Choi et al., Broadly hysteretic H2 adsorption in the microporous metal-organic framework Co(1,4-benzenedipyrazolate). J Am Chem Soc. Jun. 25, 2008;130(25):7848-50. doi: 10.1021/ja8024092. Epub May 31, 2008.
Choi et al., Hydrogen storage in water-stable metal-organic frameworks incorporating 1,3 and 1,4 benzenedipyrazolate. Energy Environ Sci. 2010;3:117-23.
Choi et al., Supported Single-Site Catalysts for Slurry and Gas-Phase Olefin Polymerisation. Can. J. of Chem. Eng. Jun. 2012;90:646-71.
Church et al., A New Multicomponent Reaction Catalyzed by a [Lewis Acid]+[Co(CO)4]-Catalyst: Stereospecific Synthesis of 1,3-Oxazinane-2,4-diones from Epoxides, Isocyanates, and CO. J. Am. Chem. Soc. 2007;129(26):8156-62. Epub Jun. 12, 2007. Abstract Only.
Church et al., Carbonylation of heterocycles by homogeneous catalysts. Chem. Commun. 2007;7:657-74. Epub Jan. 19, 2007.
Coasne et al., Temperature Effect on Adsorption/Desorption Isotherms for a Simple Fluid Confined within Various Nanopores. Adsorption. Jul. 2005;11:289-94.
Colombo et al., High thermal and chemical stability in pyrazolate-bridged metal-organic frameworks with exposed metal sites. Chem. Sci. 2011;2:1311-9. Epub Apr. 28, 2011.
Comito et al., Single-Site Heterogeneous Catalysts for Olefin Polymerization Enabled by Cation Exchange in a Metal-Organic Framework. J. Am. Chem. Soc. 2016;138(32):10232-7. Epub Jul. 21, 2016. Supporting Information Included.
Corma et al., Engineering Metal Organic Frameworks for Heterogeneous Catalysis. Chem. Rev. 2010;110(8):4606-55. Epub Apr. 1, 2010.
Critoph, Evaluation of alternative refrigerant—adsorbent pairs for refrigeration cycles. Applied Thermal Engineering. Nov. 1996;16(11):891-900.
Cui et al., An electroactive porous network from covalent metal-dithiolene links. Chem Commun. 2014;50:3986-8. Epub Feb. 24, 2014.
Cychosz et al., Water stability of microporous coordination polymers and the adsorption of pharmaceuticals from water. Langmuir. Nov. 16, 2010;26(22):17198-202. doi: 10.1021/la103234u. Epub Oct. 5, 2010.
De Lange et al., Adsorption-Driven Heat Pumps: The Potential of Metal-Organic Frameworks. Chem. Rev. 2015;115(22):12205-50. Epub Oct. 23, 2015.
De Lange et al., Metal-Organic Frameworks in Adsorption-Driven Heat Pumps: The Potential of Alcohols as Working Fluids. Langmuir. 2015;31(46):12783-96. Epub Nov. 2, 2015.
Denysenko et al., Elucidating Gating Effects for Hydrogen Sorption in MFU-4-Type Triazolate-Based Metal-Organic Frameworks Featuring Different Pore Sizes. Chem. Eur. J. 2011;17(6):1837-48. Epub Jan. 12, 2011.
Denysenko et al., Postsynthetic Metal and Ligand Exchange in MFU-4l: A Screening Approach toward Functional Metal-Organic Frameworks Comprising Single-Site Active Centers. Chem. Eur. J. May 26, 2015;21(22):8188-99.
Denysenko et al., Reversible gas-phase redox processes catalyzed by Co-exchanged MFU-4l(arge). Chem. Commun. 2012;48:1236-8. Epub Dec. 6, 2011.
Denysenko et al., Scorpionate-Type Coordination in MFU-4l Metal-Organic Frameworks: Small-Molecule Binding and Activation upon the Thermally Activated Formation of Open Metal Sites. Angew. Chemie Int. Ed. Jun. 2, 2014;53(23):5832-6.
Deria et al., Beyond post-synthesis modification: evolution of metal-organic frameworks via building block replacement. Chem. Soc. Rev. 2014;43:5896-912. Epub Apr. 11, 2014.
Desantis et al., Techno-economic Analysis of Metal-Organic Frameworks for Hydrogen and Natural Gas Storage. Energy Fuels. 2017;31(2):2024-32. Epub Jan. 4, 2017.
Dinca et al., DALTON Lecture: New Application of Metal-Organic Frameworks. UC Berkeley. Mar. 11, 2016. 49 pages.
Dinca et al., Designer Porous material for Clean Energy and Water. International Workshop on Advanced Materials. Al Hamra Fort, Ras al Khaimah, UAE. Feb. 2017. 7 pages.
Dinca et al., Teaching Sponges New Tricks: Redox Reactivity and Charge Transport in Microporous Metal-Organic Frameworks. Princeton University. Frick Chemistry Laboratory, Taylor Auditorium. Princeton, NJ. Sep. 14, 2015. 48 pages.
Dinca, Dynamic MOF SBUs as Active Sites for Small Molecule Reactivity and Catalysis. 253rd National ACS Meeting. San Francisco, CA. Apr. 2017. 10 pages.
Dinca, Teaching Sponges New Tricks: Small Molecule Chemistry and Charge Transport in Microporous Metal-Organic Frameworks. NSF Center for Chemical Innovation. Brown University. Providence, RI. May 2014. 4 pages.
Domski et al., Living alkene polymerization: New methods for the precision synthesis of polyolefins. Progress in Polymer Science. Jan. 2007;32(1):30-92.
Doonan et al., Exceptional ammonia uptake by a covalent organic framework. Nature Chemistry. 2010;2:235-8. Epub Feb. 7, 2010.
Ehrenmann et al., Water adsorption characteristics on MIL-101 for heat-transformation application of MOFs. Eur J Inorg Chem. 2011;2011(4):471-474.
Farrusseng et al., Metal-Organic Frameworks: Opportunities for Catalysis. Angew. Chemie Int. Ed. Sep. 28, 2009;48(41):7502-13.
Feigl et al., Über Verbindungen des Nickels mito-Phenylendiamin und 1, 3, 4-Toluylendiamin. Monatsh. Chem. Jul. 1927;48(7):445-50.
Férey et al., A Chromium Terephthalate-Based Solid with Unusually Large Pore Volumes and Surface Area. Science. Sep. 23, 2005;309(5743):2040-2.
Finiels et al., Nickel-based solid catalysts for ethylene oligomerization—a review. Catal. Sci. Technol. 2014;4:2412-26. Epub Apr. 16, 2014.
Froehlich et al., Multicycle water vapour stability of microporous breathing MOF aluminium isophthalate CAU-10-H. Dalton Trans. 2014;43:15300-4. Epub Aug. 26, 2014.
Furlan et al., Highly active zirconium(IV) catalyst containing sterically hindered hydridotris(pyrazolyl)borate ligand for the polymerization of ethylene. Macromolecular Rapid Communications. Oct. 2000;21(15):1054-7.
Furukawa et al., The chemistry and applications of metal-organic frameworks. Science. Aug. 30, 2013;341(6149):1230444. doi: 10.1126/science.1230444. 12 pages.
Furukawa et al., Water adsorption in porous metal-organic frameworks and related materials. J Am Chem Soc. Mar. 19, 2014;136(11):4369-81. doi: 10.1021/ja500330a. Epub Mar. 11, 2014.
Gandara et al., Porous, Conductive Metal-Triazolates and Their Structural Elucidation by the Charge-Flipping Method. Chem Eur J. Aug. 20, 2012;18(34):10595-601. Epub Jun. 22, 2012.
Garcia-Orozco et al., Tris(pyrazolyl)methane-chromium(III) complexes as highly active catalysts for ethylene polymerization. Journal of Molecular Catalysis A: Chemical. Dec. 2006;260(1-2):70-6.
Gargiulo et al., Synthesis and characterization of a microporous copper triazolate as a water vapor adsorbent. Microporous and Mesoporous Mater. 2011;145:74-9.
Garzón-Tovar et al., Optimised room temperature, water-based synthesis of CPO-27-M metal-organic frameworks with high space-time yields. J. Mater. Chem. A. 2015;3:20819-26. Epub Sep. 9, 2015.
Getzler et al., Synthesis of β-Lactones: A Highly Active and Selective Catalyst for Epoxide Carbonylation. J. Am. Chem. Soc. 2002;124(7):1174-5. Epub Jan. 24, 2002.

(56) References Cited

OTHER PUBLICATIONS

Gil et al., Copolymerization of Ethylene with 1-Hexene Using Sterically Hindered Tris(pyrazolyl)borate Titanium (IV) Compounds. Macromolecular Chemistry and Physics. Jan. 2001;202(2):319-24.
Golubovic et al., Sorption properties for different types of molecular sieve and their influence on optimum dehumidification performance of desiccant wheels. Int. J. Heat Mass Transf. Aug. 2006;49(17-18):2802-9.
Guo et al., Adsorption of NH3 onto activated carbon prepared from palm shells impregnated with H2SO4. Journal of Colloid and Interface Science. Jan. 15, 2005;281(2):285-90.
Gutzler et al., π-Electron Conjugation in Two Dimensions. J Am Chem Soc. 2013;135(44):16585-94. Epub Sep. 19, 2013.
Hao et al., Structurally Designed Synthesis of Mechanically Stable Poly(benzoxazine-co-resol)-Based Porous Carbon Monoliths and Their Application as High-Performance CO2 Capture Sorbents. J Am Chem Soc. 2011;133(29):11378-88. Epub Jun. 21, 2011.
Henninger et al., Characterisation and improvement of sorption materials with molecular modeling for the use of heat transformation applications. Adsorption. 2011;17:833-43.
Henninger et al., MOFs as adsorbents for low temperature heating and cooling applications. J Am Chem Soc. Mar. 4, 2009;131(8):2776-7. doi: 10.1021/ja808444z.
Henninger et al., MOFs for Use in Adsorption Heat Pump Processes. European Journal of Inorganic Chemistry. Jun. 2012; 2012(16):2625-34.
Henninger et al., Novel sorption materials for solar heating and cooling. Energy Procedia. 2012;30:279-88.
Henninger et al., Water adsorption characteristics of novel materials for heat transformation applications. Appl. Therm. Eng. 2010;30:1692-1702.
Herebian et al., Molecular and electronic structures of bis-(o-diiminobenzosemiquinonato)metal(II) complexes (Ni, Pd, Pt), their monocations and -anions, and of dimeric dications containing weak metal-metal bonds. J Am Chem Soc. Jul. 30, 2003;125(30):9116-28.
Hermes et al., Selective Nucleation and Growth of Metal-Organic Open Framework Thin Films on Patterned COOH/CF3-Terminated Self-Assembled Monolayers on Au(111). JACS. 2005;127:13744-5.
Hlatky, Heterogeneous Single-Site Catalysts for Olefin Polymerization. Chem. Rev. 2000;100:1347-76.
Hmadeh et al., New Porous Crystals of Extended Metal-Catecholates. Chemistry of Materials. 2012;24(18):3511-3. Epub Aug. 28, 2012.
House et al., The synthesis and X-ray structure of trans-[CrCl2(nPrNH2)4]BF4•H2O and the thermal and Hg2+-assisted chloride release kinetics from some trans-[CrCl2(N)4]+ complexes. Inorganica Chimica Acta. Sep. 1995;237(1-2):37-46.
Janchen et al., Studies of the water adsorption on Zeolites and modified mesoporous materials for seasonal storage of solar heat. Solar Energy. 2004;76:339-44.
Jasuja et al., Adjusting the Stability of Metal-Organic Frameworks under Humid Conditions by Ligand Functionalization. Langmuir. 2012;28(49):16874-80. Epub Nov. 7, 2012.
Jeon et al., Accelerated Life-time Tests including Different Load Cycling Protocols for High Temperature Polymer Electrolyte Membrane Fuel Cells. Electrochimica Acta. Dec. 1, 2014;148:15-25.
Jeremias et al., MIL-100(Al, Fe) as water adsorbents for heat transformation purposes—a promising application. J Mater Chem. 2012;22:10148-10151.
Jeremias et al., Programming MOFs for water sorption: amino-functionalized MIL-125 and UiO-66 for heat transformation and heat storage applications. Dalton Trans. Dec. 7, 2013;42(45):15967-73. doi: 10.1039/c3dt51471d. Epub Jul. 18, 2013.
Jeremias et al., Water and methanol adsorption on MOFs for cycling heat transformation processes. New J Chem. 2014;38:1846-52.
Kambe et al., Redox Control and High Conductivity of Nickel Bis(dithiolene) Complex π-Nanosheet: A Potential Organic Two-Dimensional Topological Insulator. J Am Chem Soc. 2014;136(41):14357-60. Epub Sep. 24, 2014.
Kambe et al., π-Conjugated Nickel Bis(dithiolene) Complex Nanosheet. J Am Chem Soc. 2013;135(7):2462-5. Epub Jan. 29, 2013.
Kaminsky et al., High melting polypropenes by silica-supported zirconocene catalysts. Makromol. Chem. Rapid. Commun. 1993;14:239-43.
Katz et al., High volumetric uptake of ammonia using Cu-MOF-74/Cu-CPO-27 . Dalton Trans. 2016;45:4150-3. Epub Sep. 24, 2015.
Khutia et al., Water sorption cycle measurements on functionalized MIL-101 Cr for heat transformation application. Chem Mater. 2013;25:790-798.
Killian et al., Preparation of Linear α-Olefins Using Cationic Nickel(II) α-Diimine Catalysts. Organometallics. 1997;16(10):2005-7. Epub May 13, 1997.
Klet et al., Single-Site Organozirconium Catalyst Embedded in a Metal-Organic Framework. J. Am. Chem. Soc. 2015;137(50):15680-83. Epub Dec. 14, 2015.
Kobayashi et al., Conductivity, Doping, and Redox Chemistry of a Microporous Dithiolene-Based Metal-Organic Framework. Chem Mater. 2010;22(14):4120-2. Epub Jun. 25, 2010.
Kong et al., Opportunities in chemistry and materials science for topological insulators and their nanostructures. Nature Chemistry. 2011;3:845-9. Epub Oct. 24, 2011.
Kramer et al., Practical β-Lactone Synthesis: Epoxide Carbonylation at 1 atm. Org. Lett. 2006;8(17):3709-12. Epub Jul. 18, 2006.
Kreno et al., Metal-Organic Framework Materials as Chemical Sensors. Chemical Reviews. 2012;112(2):1105-25. Epub Nov. 9, 2011.
Kunrath et al., Highly Selective Nickel Ethylene Oligomerization Catalysts Based on Sterically Hindered Tris(pyrazolyl)borate Ligands. Organometallics. 2003;22:4739-43. Epub Oct. 9, 2003.
Kusgens et al., Characterization of metal-organic frameworks by water adsorption. Microporous and Mesoporous Mater. 2009;120:325-330.
Lallemand et al., Catalytic oligomerization of ethylene over Ni-containing dealuminated Y zeolites. Appl. Catal. A Gen. Feb. 2006;301:196-201.
Lallemand et al., Ethylene oligomerization over Ni-containing mesostructured catalysts with MCM-41, MCM-48 and SBA-15 topologies. Studies in Surface Science and Catalysis. 2007;170:1863-9. Epub Oct. 18, 2007.
Lallemand et al., Ni-MCM-36 and Ni-MCM-22 catalysts for the ethylene oligomerization. Studies in Surface Science and Catalysis. 2008;174:1139-42. Epub Nov. 6, 2008.
Li et al., Design and synthesis of an exceptionally stable and highly porous metal-organic framework. Nature. 1999;402:276-9. Epub Nov. 18, 1999.
Li et al., Highly active self-immobilized FI-Zr catalysts in a PCP framework for ethylene polymerization. Chem. Commun. 2015;51:16703-6. Epub Sep. 21, 2015.
Li et al., Reductive electrosynthesis of Crystalline Metal-Organic frameworks. JACS. 2011;133:12926-9.
Liao et al., Drastic Enhancement of Catalytic Activity via Post-oxidation of a Porous MnII Triazolate Framework. Chem. Eur. J. Sep. 1, 2014;20(36):11303-7.
Liu et al., High-Performance Chemical Sensing Using Schottky-Contacted Chemical Vapor Deposition Grown Monolayer MoS2 Transistors. ACS Nano. 2014;8(5):5304-14. Epub Apr. 21, 2014.
Liu et al., Postsynthetic modification of mixed-linker metal-organic frameworks for ethylene oligomerization. RSC Adv. 2014;4:62343-6. Epub Nov. 13, 2014.
Liu et al., Single-Walled Carbon Nanotube-Metalloporphyrin Chemiresistive Gas Sensor Arrays for Volatile Organic Compounds. Chem. Mater. 2015;27(10):3560-3. Epub May 8, 2015.
Low et al., Virtual high throughput screening confirmed experimentally: porous coordination polymer hydration. J. Am. Chem. Soc. Nov. 4, 2009;131(43):15834-42. doi: 10.1021/ja9061344.
Luna et al., Evaluation of Commercial Off-the-Shelf Sorbents and Catalysts for Control of Ammonia and Carbon Monoxide. American Institute of Aeronautics and Astronautics. 2008. 15 pages.
Ma et al., A series of isoreticular chiral metal-organic frameworks as a tunable platform for asymmetric catalysis. Nat. Chem. 2010;2:838-46. Epub Jul. 25, 2010.

(56) References Cited

OTHER PUBLICATIONS

Mahadevan et al., [Lewis Acid]+[Co(CO)4]—Complexes: A Versatile Class of Catalysts for Carbonylative Ring Expansion of Epoxides and Aziridines. Angew. Chem. Int. Ed. 2002;41(15):2781-4.
Makal et al., Methane storage in advanced porous materials. Chem Soc Rev. Dec. 7, 2012;41(23):7761-79. doi: 10.1039/c2cs35251f.
Maki et al., Electron Paramagnetic Resonance Studies of the Electronic Structures of Bis(maleonitriledithiolato)copper(II), -nickel(III), -cobalt(II), and -rhodium(II) Complexes. J. Am Chem. Soc. Nov. 1964;86(21):4580-7.
Merica et al., Synthesis of nitropolychlorinated dibenzo-p-dioxins (NPCDDs) and their photochemical reaction with nucleophiles. Can. J. Chem. 1995;73:826-35.
Metzger et al., Selective Dimerization of Ethylene to 1-Butene with a Porous Catalyst. ACS Cent. Sci. 2016;2(3):148-53. Epub Feb. 19, 2016. Supporting Information Included.
Miner et al., Electrochemical oxygen reduction catalysed by Ni3(hexaiminotriphenylene)2. Nat Commun. Mar. 2016;7:10942. 7 pages.
Mlinar et al., Selective Propene Oligomerization with Nickel(II)-Based Metal-Organic Frameworks. ACS Catal. 2014;4(3):717-21. Epub Jan. 27, 2014.
Mondloch et al., Destruction of chemical warfare agents using metal-organic frameworks. Nat. Mater. 2015;14:512-6. Epub Mar. 16, 2015.
Murtuza et al., Ethylene Polymerization Behavior of Tris(pyrazolyl)borate Titanium(IV) Complexes. Organometallics. 2002;21(9):1882-90. Epub Mar. 28, 2002.
Narayan et al., High Charge Mobility in a Tetrathiafulvalene-Based Microporous Metal-Organic Framework. J Am Chem Soc. 2012;134(31):12932-5. Epub Jul. 24, 2012.
Narayanan et al., Optimization of adsorption processes for climate control and thermal energy storage. Int. J. Heat Mass Transf. Oct. 2014;77:288-300.
Ng et al., Experimental investigation of the silica gel-water adsorption isotherm characteristics. Appl. Therm Eng. 2001;21:1631-42.
Nguyen et al., High Methanol Uptake Capacity in Two New Series of Metal-Organic Frameworks: Promising Materials for Adsorption-Driven Heat Pump Applications. Chem. Mater. 2016;28(17):6243-9. Epub Aug. 8, 2016.
Noro et al., Metal-organic thin-film transistor (MOTFT) based on a bis(o-diiminobenzosemiquinonate) nickel(II) complex. J Am Chem Soc. Jul. 20, 2005;127(28):10012-3.
Park et al., Cation-Dependent Intrinsic Electrical Conductivity in Isostructural Tetrathiafulvalene-Based Microporous Metal-Organic Frameworks. J. Am. Chem. Soc. 2015;137(5):1774-7. Epub Jan. 18, 2015.
Park et al., Heterogeneous Epoxide Carbonylation by Cooperative Ion-Pair Catalysis in Co(CO)4-Incorporated Cr-MIL-101. ACS Cent. Sci. 2017;3(5):444-8. Epub Mar. 21, 2017.
Park et al., Single-Ion Li+, Na+, and Mg2+ Solid Electrolytes Supported by a Mesoporous Anionic Cu-Azolate Metal-Organic Framework. J. Am. Chem. Soc. 2017;139(38):13260-3. Epbu Sep. 7, 2017.
Petit et al., The role of sulfur-containing groups in ammonia retention on activated carbons. Carbon. Mar. 2010;48(3):654-67.
Petit et al., Toward Understanding Reactive Adsorption of Ammonia on Cu-MOF/Graphite Oxide Nanocomposites. Langmuir. 2011;27(21):13043-51. Epub Oct. 4, 2011.
Pommier et al., Recent Advances in β-Lactone Chemistry. Synthesis. 1993;5:441-59.
Qajar et al., Enhanced ammonia adsorption on functionalized nanoporous carbons. Microporous and Mesoporous Materials. Dec. 1, 2015;218:15-23.
Rieth et al., High and Reversible Ammonia Uptake in Mesoporous Azolate Metal-Organic Frameworks with Open Mn, Co, and Ni Sites. J. Am. Chem. Soc. 2016;138(30):9401-4. Epub Jul. 15, 2016.
Rieth et al., Record Atmospheric Fresh Water Capture and Heat Transfer with a Material Operating at the Water Uptake Reversibility Limit. ACS Cent. Sci. 2017;3(6):668-72. Epub May 24, 2017. Supporting Information Included.
Ristic et al., The performance of small-pore microporous aluminophosphates in low-temperature solar energy storage: the structure-property relationship. Adv Func Mater. 2012;22:1952-7.
Saha et al., Fundamental and application aspects of adsorption cooling and desalination. Appl. Therm. Eng. Mar. 25, 2016;97:68-76.
Schmidt et al., A Readily Synthesized and Highly Active Epoxide Carbonylation Catalyst Based on a Chromium Porphyrin Framework: Expanding the Range of Available β-Lactones. Org. Lett. 2004;6(3):373-6. Epub Jan. 8, 2004.
Schmidt et al., Chromium(III) Octaethylporphyrinato Tetracarbonylcobaltate: A Highly Active, Selective, and Versatile Catalyst for Epoxide Carbonylation. J. Am. Chem. Soc. 2005;127(32):11426-35. Epub Jul. 16, 2005.
Schoenecker et al., Effect of water adsorption on retention of structure and surface area of metal-organic frameworks. Ind Eng Chem Res. 2012;51:6513-6519.
Severn et al., "Bound but Not Gagged" Immobilizing Single-Site α-Olefin Polymerization Catalysts. Chem. Rev. 2005;105:4073-147. Epub Oct. 22, 2005.
Shamir, New synthesis of chromium trichloride tetrahydrofuranate. Inorganica Chimica Acta. Feb. 15, 1989;156(2):163-4.
Sheberla et al., Conductive MOF electrodes for stable supercapacitors with high areal capacitance. Nature Materials. 2017;16:220-4. Epub Oct. 10, 2016. Supporting Information Included.
Sheberla et al., High Electrical Conductivity in Ni3(2,3,6,7,10,11-hexaiminotriphenylene)2, a Semiconducting Metal-Organic Graphene Analogue. J Am Chem Soc. 2014;136(25):8859-62. Epub Apr. 21, 2014. Supporting Information Included.
Shustova et al., Selective Turn-On Ammonia Sensing Enabled by High-Temperature Fluorescence in Metal-Organic Frameworks with Open Metal Sites. J Am Chem Soc. 2013;135(36):13326-9. Epub Aug. 27, 2013.
Speiser et al., Catalytic Ethylene Dimerization and Oligomerization: Recent Developments with Nickel Complexes Containing P,N-Chelating Ligands. Acc. Chem. Res. 2005;38(10):784-93. Epub Sep. 9, 2005.
Stavila et al., MOF-based electronic and opto-electronic devices. Chem Soc Rev. Aug. 21, 2014;43(16):5994-6010. doi: 10.1039/c4cs00096j.
Stiefel et al., The Myth of Nickel(III) and Nickel(IV) in Planar Complexes. J. Am. Chem. Soc. Jul. 1965;87(13):3016-7.
Stoeckli et al., Specific and non-specific interactions between ammonia and activated carbons. Carbon. 2004;42(8-9):1619-24.
Suh et al., Hydrogen storage in metal-organic frameworks. Chem Rev. 2012;112:782-835.
Sumida et al., Carbon dioxide capture in metal-organic frameworks. Chem Rev. Feb. 8, 2012;112(2):724-81. doi: 10.1021/cr2003272. Epub Dec. 28, 2011.
Sun et al., Electrically Conductive Porous Metal-Organic Frameworks. Angew Chem Int Ed Engl. Mar. 7, 2016;55(11):3566-79. doi: 10.1002/anie.201506219. Epub Jan. 8, 2016. Review.
Sun et al., Measuring and Reporting Electrical Conductivity in Metal-Organic Frameworks: Cd2(TTFTB) as a Case Study. J Am Chem Soc. 2016;138(44):14772-82. Epub Oct. 21, 2016.
Sun et al., Mn2(2,5-disulfhydrylbenzene-1,4-dicarboxylate): A Microporous Metal-Organic Framework with Infinite (-Mn—S-)∞ Chains and High Intrinsic Charge Mobility. J Am Chem Soc. 2013;135(22):8185-8. Epub May 14, 2013.
Svejda et al., Ethylene Oligomerization and Propylene Dimerization Using Cationic (α-Diimine)nickel(II) Catalysts. Organometallics. 1999;18(1):65-74. Epub Dec. 15, 1998.
Talin et al., Tunable electrical conductivity in metal-organic framework thin-film devices. Science. Jan. 3, 2014;343(6166):66-9. doi: 10.1126/science.1246738. Epub Dec. 5, 2013.
Tamainot-Telto et al., Carbon-ammonia pairs for adsorption refrigeration applications: ice making, air conditioning and heat pumping. International Journal of Refrigeration. Sep. 2009;32(6):1212-29.
Tatsidjodoung et al., A review of potential materials for thermal energy storage in building applications. Renew. Sust. Energ. Rev. 2013;18:327-49.

(56) References Cited

OTHER PUBLICATIONS

Teufel et al., MFU-4—A Metal-Organic Framework for Highly Effective H2/D2 Separation. Adv. Mater. Jan. 2013;25(4):635-9.
Theopold, Homogeneous Chromium Catalysts for Olefin Polymerization. Eur. J. Inorg. Chem. Jan. 1998;1:15-24.
Tonigold et al., Pyrazolate-based cobalt(II)-containing metal-organic frameworks in heterogeneous catalytic oxidation reactions: elucidating the role of entatic states for biomimetic oxidation processes. Chemistry. Jul. 25, 2011;17(31):8671-95. doi: 10.1002/chem.201003173. Epub Jun. 17, 2011.
Tulchinsky et al., Reversible Capture and Release of Cl2 and Br2 with a Redox-Active Metal-Organic Framework. J. Am. Chem. Soc. 2017;139(16):5992-7. Epub Mar. 28, 2017.
Van Humbeck et al., Ammonia Capture in Porous Organic Polymers Densely Functionalized with Brønsted Acid Groups. J. Am. Chem. Soc. 2014;136(6):2432-40. Epub Jan. 23, 2014.
Wade et al., Facile Deposition of Multicolored Electrochromic Metal-Organic Framework Thin Films. Angew Int. Ed. 2013;52(50):13377-81. Epub Oct. 16, 2013.
Wade et al., Investigation of the synthesis, activation, and isosteric heats of CO2 adsorption of the isostructural series of metal-organic frameworks M3(BTC)2 (M=Cr, Fe, Ni, Cu, Mo, Ru). Dalton Trans. Jul. 14 2012;41(26):7931-8. doi: 10.1039/c2dt30372h. Epub Apr. 26, 2012.
Wade et al., Postsynthetic tuning of hydrophilicity in pyrazolate MOFs to modulate water adsorption properties. Energy Environ. Sci. 2013;6:2172-7.
Wade, Designing functionality for anion detection with molecular receptors and small molecule adsorption in microporous materials. PowerPoint Presentation. Brandeis University. Dec. 4, 2012. 50 pages.
Wang et al., A review on adsorption working pairs for refrigeration. Renewable and Sustainable Energy Reviews. Apr. 2009;13(3):518-34.
Wang et al., Organic topological insulators in organometallic lattices. Nat Commun. 2013;4:1471. Epub Feb. 12, 2013. 5 pages.
Wang et al., Prediction of a Two-Dimensional Organic Topological Insulator. Nano Lett. 2013;13(6):2842-5. Epub May 16, 2013.
Wang et al., Pyrazolate-Based Porphyrinic Metal-Organic Framework with Extraordinary Base-Resistance. J. Am. Chem. Soc. 2016;138(3):914-9. Epub Dec. 30, 2015.
Wickenheisser et al., Grafting of hydrophilic ethylene glycols or ethylenediamine on coordinatively unsaturated metal sites in MIL-100(Cr) for improved water adsorption characteristics. Inorganica Chimica Acta. 2013;407:145-52.
Wu et al., A Homochiral Porous Metal-Organic Framework for Highly Enantioselective Heterogeneous Asymmetric Catalysis. J. Am. Chem. Soc. 2005;127(25):8940-1. Epub Jun. 4, 2005.
Wu et al., Adsorption sites and binding nature of CO2 in prototypical metal-organic frameworks: a combined neutron diffraction and first-principles study. J Phys Chem Lett. 2010;1(13):1946-51.
Xiao et al., Oxidation of ethane to ethanol by N2O in a metal-organic framework with coordinatively unsaturated iron(II) sites. Nat Chem. Jul. 2014;6(7):590-5. doi: 10.1038/nchem.1956. Epub May 18, 2014.
Yamada et al., First-Principles Design of Half-Filled Flat Band of the Kagome Lattice in Two-Dimensinoal Metal-Organic Frameworks. Jul. 26, 2016. arXiv:1510.00164v3.
Yamazoe et al., Receptor Function and Response of Semiconductor Gas Sensor. Journal of Sensors. 2009;2009:21 pages.
Yang et al., Temperature-Triggered Collection and Release of Water from Fogs by a Sponge-Like Cotton Fabric. Adv. Mater. Feb. 25, 2013;25(8):1150-4.
Zhang et al., Ethylene Oligomerization Over Heterogeneous Catalysts. Energy and Environment Focus. Sep. 2014;3(3):246-56.
International Search Report and Written Opinion for PCT/US17/34700 dated Aug. 23, 2017.
Marshall et al., Single-Crystal to Single-Crystal Mechanical Contraction of Metal-Organic Frameworks through Stereoselective Postsynthetic Bromination. J. Am. Chem. Soc. 2015;137:9527-30. Epub Jul. 15, 2015.
International Preliminary Report on Patentability for PCT/US2017/055035 dated Apr. 18, 2019.
Park et al., Heterogeneous Epoxide Carbonylation by Cooperative Ion-Pair Catalysis in Co(CO)4-Incorporated Cr-MIL-101. ACS Cent. Sci. 2017;3(5):444-8. Epub Mar. 21, 2017. Supporting Information Included.
U.S. Appl. No. 16/240,629, filed Jan. 4, 2019, Dinca et al.
U.S. Appl. No. 16/339,688, filed Apr. 4, 2019, Román-Leshkov et al.
PCT/US2017/055035, Apr. 18, 2019, International Preliminary Report on Patentability.

\* cited by examiner

COMPOSITIONS COMPRISING METAL ORGANIC FRAMEWORKS FOR THE UPTAKE OF COMPOUNDS AND RELATED METHODS

RELATED APPLICATIONS

This application claims priority under 35 U.S.C. § 119(e) to U.S. Provisional Application Ser. No. 62/441,024, filed on Dec. 30, 2016. This application claims priority under 35 U.S.C. § 119(e) to U.S. Provisional Application Ser. No. 62/342,719, filed on May 27, 2016, which are herein incorporated by reference in their entireties.

FIELD

Compositions comprising metal organic frameworks (MOFs) are generally provided and related methods. In some embodiments, a MOF comprises a plurality of metal ions, each metal ion coordinated with at least one ligand comprising at least two N-heterocyclic aromatic groups arranged about an organic core. In some embodiments, the compositions and/or methods relate to the uptake of compounds (e.g., ammonia, water, halogens).

BACKGROUND

The uptake of compounds plays an important role in many applications. For example, activated carbons are the current industrial standard for adsorption of ammonia for gas cleanup. Oxidation of carbon surfaces, or acid-washing, is often used to generate oxygen rich or acidic sites for ammonia sorption to improve ammonia affinity and capacity in these materials. However, even the best of these materials suffer from relatively low ammonia capacity of approximately 11-12 mmol/g. Additionally, the sites for sorption in these materials are poorly defined, and therefore the adsorption enthalpy for ammonia can vary widely across the various oxygen containing carbon sites.

For adsorption heat pump and thermal battery applications, the activated carbon-ammonia working pair has been studied for adsorption cooling. However, the ammonia capacities are too low. Ammonia exchange capacity, the amount of ammonia adsorbed and desorbed per gram adsorbent during the working and regeneration cycles, is a criterion since it ultimately dictates the amount of heat transferred in a given cycle. Additionally, the broad, poorly defined distribution of sorption sites in the activated carbon materials produces a distribution of adsorption enthalpies for ammonia, an undesirable trait that prevents full utilization of the total uptake capacity.

As another non-limiting example, molecular bromine is another industrially important raw chemicals and is used in many applications, including for the preparation of flame retardants, agricultural products, and pharmaceuticals. Unfortunately, its extreme toxicity and high corrosiveness poses a serious challenge for safe handling, storage and transportation. Despite decades of experience in mitigating these challenges, tragic accidents still occur worldwide due to leaks or explosions, making the development of recyclable materials that can enable safe handling, and on-demand delivery of bromine highly desirable Accordingly, improved compositions and methods are needed.

SUMMARY

The present disclosure relates to composition and related methods for the uptake of compounds (e.g., of ammonia, of water, or halogens). The subject matter of the present invention involves, in some cases, interrelated products, alternative solutions to a particular problem, and/or a plurality of different uses of one or more systems and/or articles.

In one aspect, methods are described. In some embodiments, a method comprises exposing a metal organic framework (MOF) to a compound, wherein the MOF adsorbs at least a portion of the compound, wherein the compound is selected from the group consisting of ammonia, water, or a halogen, wherein the MOF comprises a plurality of metal ions, each metal ion coordinated with at least one ligand, and wherein the at least one ligand comprises at least two azolate groups arranged about an organic core.

In some embodiments, the method comprises exposing a metal organic framework (MOF) to ammonia, wherein the MOF adsorbs at least a portion of the ammonia, wherein the MOF comprises a plurality of metal ions, each metal ion coordinated with at least one ligand, and wherein the at least one ligand comprises at least two azolate groups arranged about an organic core.

Certain aspects are related to MOFs. Is some embodiments, a MOF is provided comprising a plurality of metal ions; a plurality of ligands comprising two unsaturated N-heterocyclic aromatic groups; a plurality of auxiliary ligands, wherein the MOF has a crystalline structure with tetragonal symmetry comprising helices of metal ions, wherein each metal ion in the helices is associated with three of the first type of ligand and at least two auxiliary ligands, each of which bridge between two metals ions, the two metal ions being the same or different for each bridging ligand, and wherein the MOF comprises pores with an average pore diameter of greater than or equal to 20 Angstroms.

In some embodiments, the MOF comprises a plurality of metal ions; a plurality of ligands comprising two unsaturated N-heterocyclic aromatic groups; a plurality of auxiliary ligands, wherein the MOF has a crystalline structure with tetragonal symmetry comprising helices of metal ions, wherein each metal ion in the helices is associated with three of the first type of ligand and at least two auxiliary ligands, each of which bridge between two metals ions, the two metal ions being the same or different for each bridging ligand, and wherein the MOF comprises pores with an average pore diameter of greater than or equal to 23 Angstroms.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosures, the present specification shall control. If two or more documents incorporated by reference include conflicting and/or inconsistent disclosures with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
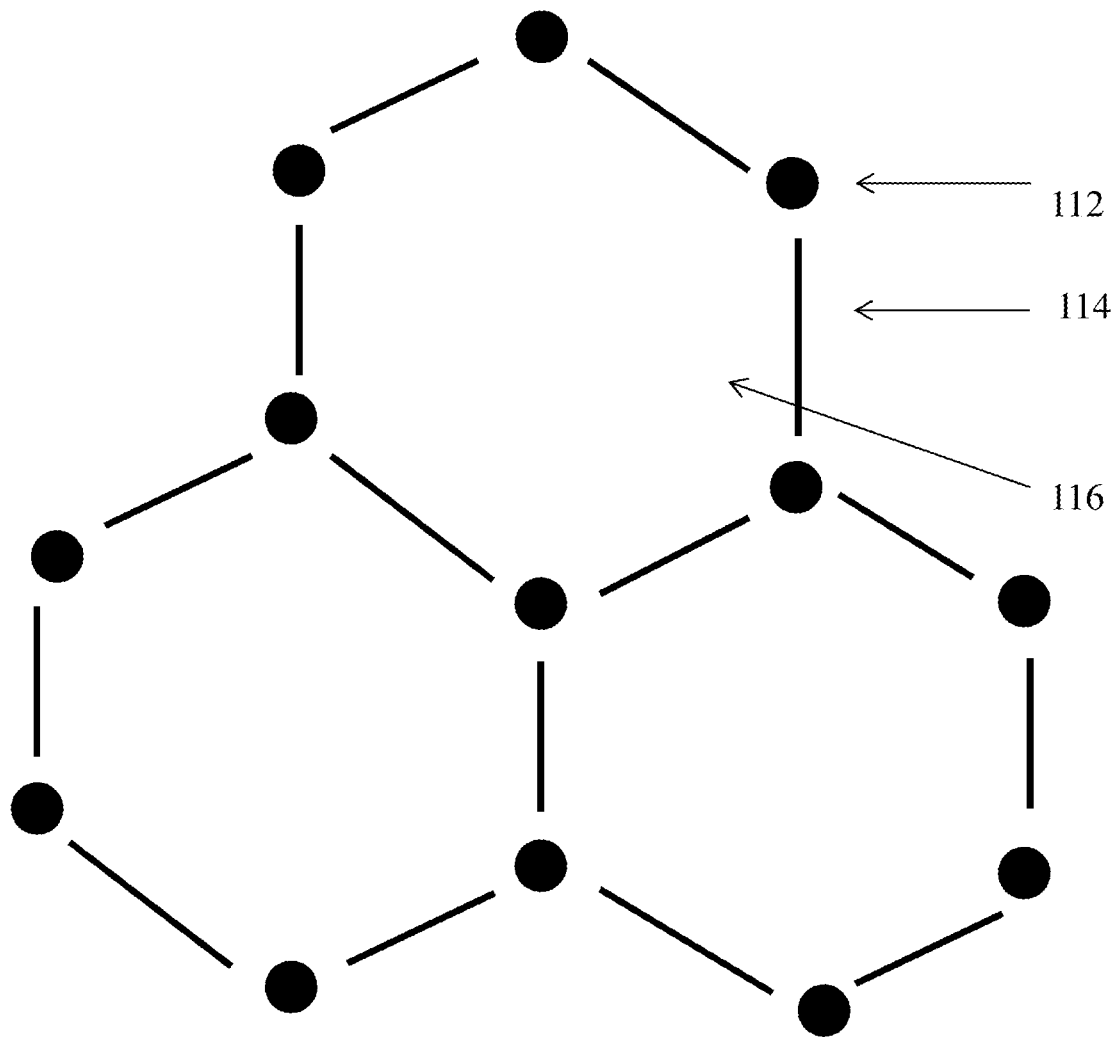
FIG. 1 shows, according to certain embodiments, a schematic depiction of a MOF in which metal ions are linked together by ligands around pores.

Compositions and methods for uptake of compounds (e.g., of ammonia, of water, of halogens) comprising metal organic frameworks (MOFs) are generally provided. In some embodiments, a MOF comprises a plurality of metal ions, each coordinated with at least one ligand, wherein each ligand comprises at least two unsaturated N-heterocyclic aromatic groups.

The term "metal-organic framework" is given its ordinary meaning in the art and refers to a one-, two-, or three-dimensional coordination polymer including metal ions and ligands which function as organic structural units, wherein a portion of the metal ions are each chemically bonded to at least one bi-, tri- or poly-dentate organic structural unit. The metal ions, in addition to being coordinated with at least one ligand, may also be bound to one or more auxiliary ligands, as described in more detail herein.

The MOFs described herein may be utilized as adsorbents for compounds (e.g., for ammonia, for water, for halogens). For example, in some embodiments, the MOFs may be used as adsorbents (e.g., for ammonia, for water, for halogens) for one or more of thermal battery, heat pumping, heat storage, gas cleanup, and/or air purification applications. According to certain embodiments, the MOFs may also be incorporated as one component of an article or device; they may be utilized in, e.g., filters, gas masks, adsorption heat pump devices, and thermal batteries. As yet another example, the MOFs may be used for the storage and/or transportation of hazardous compounds (e.g., halogens)

In some embodiments, MOFs may be incorporated into gas masks. Such MOFs may, in certain embodiments, be capable of removing a compound (e.g., ammonia, water, halogen) from air comprising the compound (e.g., ammonia, halogen) or other toxic gases at a level less than or equal to about 100 ppm or greater (e.g., about 0.001 bar, about 0.005 bar, about 0.01 bar, about 0.05 bar, about 0.1 bar, about 0.5 bar, about 1 bar, etc.). Gas masks may comprise sealed cartridges which comprise the MOFs, which are opened to air when needed.

According to certain embodiments, MOFs may be incorporated into heat pumps and/or thermal batteries. In some embodiments, a sharp uptake at low pressure of a compound (e.g., ammonia, water) may be useful for a thermal battery application. Additionally, according to certain embodiments, an ability to tune the enthalpy of adsorption for the compound (e.g., ammonia, water) may allow for modulation of the cooling temperature as well as the required regeneration temperature. In some such applications, the MOFs may serve to adsorb and/or desorb at least 99% the compound (e.g., ammonia, water). According to certain embodiments, the MOFs may compose one component of a closed system. In some embodiments application, a closed vessel of a liquid (e.g., liquid ammonia, liquid water) inside a container to be cooled may be connected, via a tube with a valve, to an adsorbent bed outside the vessel to be cooled. The system may or may not be pressurized. Upon opening the valve, in certain embodiments, the liquid may evaporate from the closed vessel, cooling the vessel. According to some embodiments, the gaseous compound (e.g., gaseous ammonia, gaseous water) may then be adsorbed into the adsorbent. By using an adsorbent with a higher affinity at low pressure for the compound (e.g., ammonia, water), cooling to lower temperatures may be enabled in some embodiments. In accordance with certain embodiments, the adsorbent can be regenerated later by heating the adsorbent and cooling the vessel. In this way, the activated adsorbent may act as a store of cooling power, even when far from the driving energy source of the cooling cycle.

According to other embodiments, MOFs may be incorporated into systems for the storage and/or transportation of compounds (e.g., ammonia, halogens such as bromine). According to some embodiments, a system comprising the MOF may be exposed to the gaseous compound (e.g., gaseous halogen such as bromine) may then be adsorbed into the adsorbent. The gaseous compound may be contained within in the MOF for significant periods of time, and thus, may be used to store the gaseous compounds. For example, no or essentially no (e.g., less than 5 wt %, less than 4 wt %, less than 3 wt %, less than 2 wt %, less than 1 wt %, less than 0.5 wt %, less than 0.1 wt %, less than 0.05 wt %, less than 0.01 wt %, less than 0.005 wt %, or less than 0.001 wt % versus the total weight of the MOF and the gaseous compound) gaseous compound may be release from the MOF at room temperature (e.g., 25° C.) and/or pressure (1 atm).

Those of ordinary skill in the art will be aware of methods for determine the wt % loss of a system.

In yet another non-limiting embodiment, the MOFs may be incorporated in systems for storage and release of water, such as an atmospheric water generator. For example, under desert conditions, the system may adsorb water during the night and release water during the day under common environmental conditions. As a specific example, the average day time temperature and relative humidity (RH) in a desert may be 40° C. and 5%, respectively, and at night, 25° C. and 35% respectively. Under such conditions, an MOF may absorb the water at night and release the water during the day up to 50 wt %, up to 60 wt %, up to 70 wt %, up to 80 wt %, up to 85 wt %, up to 90 wt %, up to 95 wt %, or more, of the weight of the MOF. In some such embodiments, the MOFs may be incorporated into an article or device in their native state. In certain other embodiments, the MOFs may be incorporated into an article comprising a binder and/or an additive. Such binders or additives may include but are not limited to one or more polymers, thermal conductivity enhancers, and activated carbons. A non-limiting example of a suitable polymer is polyvinylidine fluoride (PVDF).

The MOFs described herein may have particular advantages for performing adsorption of gases. According to certain embodiments, the MOFs described herein may have particular advantages for performing adsorption of one or more of water, halogens, carbon dioxide, methanol, ethanol, sulfur dioxide, chlorofluorocarbons, hydrofluorocarbons, and ammonia in comparison to other materials. The term "halogen" is given its ordinary meaning in the art and refers to a member of the halogen family selected from the group consisting of fluorine, chlorine, bromine, and iodine. Generally, the halogen is in the form of molecular halogen. In some embodiments, the halogen in molecular bromine (e.g., $Br_2$). In some embodiments, the halogen is molecular chlorine (e.g., $Cl_2$). In some embodiments, the halogen is molecular fluorine (e.g., $F_2$). In some embodiments, the halogen is molecular iodine (e.g., $I_2$). In some embodiments, the halogen may be a pseudohalogen (e.g., $(CN)_2$).

In some embodiments, the MOFS may have a particular advantage for performing ammonia adsorption, water adsorption, or halogen adsorption in comparison to other materials. For example, the MOFs described herein may comprise greater ammonia, water, and/or halogen capacities, be capable of performing single-site ammonia, water, and/or halogen sorption at a well-defined coordination vacancy, have a high surface area, allow for high gas diffusion kinetics, have a high affinity for ammonia, water, and/or halogen at low pressures, and/or have adsorption enthalpy and/or binding strength for ammonia, water, and/or halogen that can be tuned by changing the composition (e.g. component metal ion) without changing the structure. Additional details are described herein. In certain embodiments, the MOFs may comprise azolate comprising ligands or other ligands, which may improve the stability of the MOFs. In some embodiments, the MOFs may comprise large open channels which allow for rapid diffusion (e.g., of ammonia, of water, of halogen) to available sorption sites. According to certain embodiments, the MOFs may comprise open metal sites capable of removing trace gaseous compounds (e.g., ammonia, water, halogens) from gas streams.

In some embodiments, a MOF may be exposed by to a gaseous compound (e.g., ammonia, water, halogen) and then adsorb at least a portion of the gaseous compound. According to certain embodiments, exposure of a MOF to the gaseous compound to be adsorbed (e.g., ammonia, water, halogen) may comprise molecular contact between the MOF and one or more molecules of the gaseous compound to be adsorbed. A MOF may be exposed to the gaseous compound to be adsorbed in any suitable form, such as in solid form, in liquid form, and/or in gaseous form. A MOF may be exposed to a gaseous compound (e.g., gaseous ammonia, gaseous water, gaseous halogen) at any suitable pressure or partial pressure. According to certain embodiments, adsorption may comprise reversible and/or irreversible binding of the compound (e.g., ammonia, water) to the MOF.

In some embodiments, the compound may be undergo a redox and/or structural change upon adsorption. In some embodiments, some or all of the metal centers of the MOF may be capable of undergoing or undergo a reversible one electron redox process. For example, in the case of molecular halogen, the molecular halogen may undergo reaction with a portion of the metal centers of the MOF and at least a portion of the metal centers may be oxidized and the halogen molecules reduced to form halide ions, thereby forming metal-coordinate halide bonds. For example, in embodiments wherein a portion of the metal centers of the MOF are Co(II), and the compound to be adsorbed is molecular bromine, the Co(II) centers may undergo oxidation to Co(III) and the molecular bromine associates with the Co(III) as bromide ions. Upon heating of the MOF, the halide ions may dissociate and reform molecular bromine, and the metal centers may be oxidized, thereby reforming the MOF and the molecular bromine.

The MOF may be exposed to the compound (e.g., to ammonia, to water, to halogen) at any suitable pressure and amount. In some embodiments, the MOF is exposed to the compound at a pressure of about 0.01 bar, about 0.05 bar, about 0.1 bar, about 0.2 bar, about 0.3 bar, about 0.4 bar, about 0.5 bar, or about 0.75 bar, or about 0.9 bar, or about 1 bar, or about 1.5 bar, or about 2 bar, and the wt % of the compound in the gas is about 10 wt %, or about 15 wt %, or about 20 wt %, or about 30 wt %, or about 40 wt %, or about 50 wt %, or about 60 wt %, or about 70 wt %, or about 80 wt %, or about 90 wt %, or about 95 wt %, or about 96 wt %, or about 97 wt %, or about 98 wt %, or about 99 wt %, or about 99.5 wt %, or about 99.9 wt %, or essentially pure compound (e.g., essentially pure ammonia, essentially pure water, essentially pure halogen).

Without wishing to be bound by theory, adsorption of a compound (e.g., ammonia, water, halogens) to the MOFs may proceed in the following manner. In certain embodiments, the compound may bind to open coordination sites on metals during initial uptake. Molecules of the compound may bind to open metal sites in any suitable way, such as by one or more of a metal-ligand bond, a covalent bond, an ionic bond, a hydrogen bond, an acid-base interaction, a dipole-dipole interaction, and a van der Waals interaction. Then, according to some embodiments, additional molecules of the species may be adsorbed via binding to still open metal coordination sites and/or to the previously adsorbed molecules. The molecules may bind to each other in any suitable way, such as by one or more of a hydrogen bond, a dipole-dipole interaction, and a van der Waals interaction. Other methods of uptake are also possible. For example, as described above, in the case of halogens (e.g., $Br_2$), the halogen atoms may disassociate and bind as single atoms (e.g., as Br) to the metal center. For example, at least a portion of the metal atoms of the MOF upon exposure to the gaseous halogen (e.g., $Br_2$) may undergo oxidation and associate with a bromide (e.g., as a metal-coordinated bromide ion).

In some embodiments, the MOFs may be able to adsorb large quantities of a compound (e.g., ammonia, water, halogens) in part due to the structure of the MOFs. For example, the MOFs may comprise metal ions with open coordination sites and/or the MOFs may have large pores. In some embodiments, molecules of the compound (e.g., ammonia) may bind to the metal ions with open coordination sites, and the large pore may also allow for additional molecules (e.g., of ammonia) to bind (e.g., via hydrogen-bonding) to the molecules (e.g., ammonia molecules) bound to the metal ions. Thus, multiple layers of the compound (e.g., ammonia) may bind to the pores, resulting in high adsorption (e.g., of ammonia).

In some embodiments, the MOFs are capable of adsorbing a high amount of a species (e.g., ammonia, water, halogen). In some embodiments, the ability of the MOF to adsorb the compound (e.g., ammonia) may be determined by determining the amount of the compound (e.g., ammonia) incorporated into the MOF after exposure of the MOF to an environment that contains the compound (e.g., an ammonia-containing environment). In certain embodiments, an compound-containing environment (e.g., an ammonia-containing environment) may be a source of gas at a selected pressure which comprises the compound (e.g., ammonia) in a selected amount. In accordance with some embodiments, the environment may comprise a gaseous atmosphere at a pressure of 1 bar where the species makes up at least 99 wt % of the gas that is present. In a particular embodiment, the environment may comprise greater than at least 99% ammonia gas at a pressure of 1 bar. In certain embodiments, the environment may comprise air with about 100 ppm of the compound (e.g., of ammonia). In embodiments wherein the compound to be adsorbed is water, the compound may be exposed to an environment comprising saturated water vapor.

According to certain embodiments, the MOFs may be capable of adsorbing greater than or equal to about 6 mmol ammonia per gram of adsorbent, greater than or equal to about 8 mmol ammonia per gram of adsorbent, greater than or equal to about 8.6 mmol ammonia per gram of adsorbent, greater than or equal to about 10 mmol ammonia per gram of adsorbent, greater than or equal to about 11.2 mmol ammonia per gram of adsorbent, greater than or equal to about 12 mmol ammonia per gram of adsorbent, greater than or equal to about 12.4 mmol ammonia per gram of adsorbent, greater than or equal to about 13 mmol ammonia per gram of adsorbent, greater than or equal to about 13.3 mmol ammonia per gram of adsorbent, greater than or equal to about 14 mmol ammonia per gram of adsorbent, greater than or equal to about 14.5 mmol ammonia per gram of adsorbent, greater than or equal to about 16 mmol ammonia per gram of adsorbent, greater than or equal to about 16.2 mmol ammonia per gram of adsorbent, greater than or equal to about 17 mmol ammonia per gram of adsorbent, greater than or equal to about 17.2 mmol ammonia per gram of adsorbent, greater than or equal to about 17.3 mmol ammonia per gram of adsorbent, greater than or equal to about 18 mmol ammonia per gram of adsorbent, greater than or equal to about 19 mmol ammonia per gram of adsorbent, or greater than or equal to about 20 mmol ammonia per gram of adsorbent when exposed to at least 99% ammonia gas at 1 bar. In accordance with some embodiments, the MOFs may be capable of removing less than or equal to about 20 mmol ammonia per gram of adsorbent, less than or equal to about 18 mmol ammonia per gram of adsorbent, less than or equal to about 17.3 mmol ammonia per gram of adsorbent, less than or equal to about 17.2 mmol ammonia per gram of adsorbent, less than or equal to about 17 mmol ammonia per gram of adsorbent, less than or equal to about 16.2 mmol ammonia per gram of adsorbent, less than or equal to about 16 mmol ammonia per gram of adsorbent, less than or equal to about 14.5 mmol ammonia per gram of adsorbent, less than or equal to about 14 mmol ammonia per gram of adsorbent, less than or equal to about 13.3 mmol ammonia per gram of adsorbent, less than or equal to about 13 mmol ammonia per gram of adsorbent, less than or equal to about 12.4 mmol ammonia per gram of adsorbent, less than or equal to about 12 mmol ammonia per gram of adsorbent, less than or equal to about 11.2 mmol ammonia per gram of adsorbent, less than or equal to about 10 mmol ammonia per gram of adsorbent, less than or equal to about 8.6 mmol ammonia per gram of adsorbent, or less than or equal to about 8 mmol ammonia per gram of adsorbent when exposed to at least 99% ammonia gas at 1 bar. Combinations of the above-referenced ranges are possible (e.g., greater than or equal to about 8.6 mmol ammonia per gram of adsorbent and less than or equal to about 17.9 mmol ammonia per gram of adsorbent when exposed to ammonia gas at 1 bar). Other ranges are also possible. Those of ordinary skill in the art will be aware of methods for determining the amount of ammonia adsorbed by a MOF. For example, the MOF may be heated to remove residual solvent, weighed and then attached to a gas sorption analyzer. The gas sorption analyzer may then expose the MOF to ammonia and determine the amount adsorbed by the MOF.

According to certain embodiments, the MOFs may be capable of adsorbing greater than or equal to about 0.25 gram water per gram of adsorbent, greater than or equal to about 0.5 gram water per gram of adsorbent, greater than or equal to about 0.75 gram water per gram of adsorbent, greater than or equal to about 0.8 gram water per gram of adsorbent, greater than or equal to about 0.9 gram water per gram of adsorbent, greater than or equal to about 1 gram water per gram of adsorbent, greater than or equal to about 1.1 gram water per gram of adsorbent, greater than or equal to about 1.25 gram water per gram of adsorbent, greater than or equal to about 1.5 gram water per gram of adsorbent, greater than or equal to about 2 gram water per gram of adsorbent, greater than or equal to about 3 gram water per gram of adsorbent, greater than or equal to about 4 gram water per gram of adsorbent, greater than or equal to about 5 gram water per gram of adsorbent when exposed to saturation vapor pressure of water at 25° C. Combinations of the above-referenced ranges are possible (e.g., greater than or equal to about 0.75 gram water per gram of adsorbent and less than or equal to about 1.5 gram water per gram of adsorbent when exposed to saturated water vapor at 25° C.). Other ranges are also possible. Those of ordinary skill in the art will be aware of methods for determining the amount of water adsorbed by a MOF. For example, the MOF may be heated to remove residual solvent, weighed and then attached to a gas sorption analyzer. The gas sorption analyzer may then expose the MOF to water and determine the amount adsorbed by the MOF.

The adsorption of the MOFs (e.g., of ammonia, of water) may have any suitable dependence on the pressure of the compound to be adsorbed. In some embodiments, the MOFs may exhibit a Type I isotherm. According to certain embodiments, MOFs displaying a Type I isotherm may have sharp uptake (e.g., of ammonia) at low pressures.

According to certain embodiments, the MOFs may be used in multiple adsorption cycles, wherein the adsorption capacity for a compound (e.g., ammonia, water, halogen) is substantially retained. Such adsorption cycles may, in certain embodiments, comprise exposing a MOF to the compound (e.g., until the MOF has reached adsorption saturation of the compound, e.g., ammonia, water, halogen) and then exposing the MOF to conditions to desorb the adsorbed compound (e.g., ammonia, water, halogen). The conditions may comprise heating and/or exposing the MOF to reduced pressures to evaporate the adsorbed species. Thus, in such embodiments, the MOFs may be capable of both adsorbing and desorbing the compound (e.g., ammonia, water, halogen). According to some embodiments, a MOF may retain greater than or equal to 50% of the initial adsorption capacity on the third adsorption cycle, greater than or equal to 75% of the initial adsorption capacity on the third adsorption cycle, greater than or equal to 90% of the initial adsorption capacity on the third adsorption cycle, greater than or equal to 95% of the initial adsorption capacity on the third adsorption cycle, greater than or equal to 96.5% of the initial adsorption capacity on the third adsorption cycle, greater than or equal to 99% of the initial adsorption capacity on the third adsorption cycle, or greater than or equal to 100% of the initial adsorption capacity on the third adsorption cycle. In certain embodiments, a MOF may retain less than or equal to 120% of the initial adsorption capacity on the third adsorption cycle, less than or equal to 100% of the initial adsorption capacity on the third adsorption cycle, less than or equal to 99% of the initial adsorption capacity on the third adsorption cycle, less than or equal to 96.5% of the initial adsorption capacity on the third adsorption cycle, less than or equal to 95% of the initial adsorption capacity on the third adsorption cycle, less than or equal to 90% of the initial adsorption capacity on the third adsorption cycle, or less than or equal to 75% of the initial adsorption capacity on the third adsorption cycle. Combinations of the above-referenced ranges are also possible (e.g., greater than or equal to 96.5% of the initial adsorption capacity and less than or equal to 100% of the initial adsorption capacity). Other ranges are also possible.

In accordance with certain embodiments, the MOFs may retain a high level of adsorption of a compound (e.g., ammonia, water, halogen) over multiple adsorption cycles. In some embodiments, the MOFs may retain 90% of the initial adsorption capacity over at least two cycles, at least three cycles, at least four cycles, or exactly five cycles. According to certain embodiments, the MOFs may retain 90% of the initial adsorption capacity over fewer than five cycles, fewer than four cycles, or fewer than three cycles. Combinations of the above-referenced ranges are also possible (e.g., at least two cycles and fewer than four cycles). Other ranges are also possible. In some embodiments, the MOFs may retain 95% of the initial adsorption capacity over at least two cycles, at least three cycles, at least four cycles, or exactly five cycles. According to certain embodiments, the MOFs may retain 95% of the initial adsorption capacity over fewer than five cycles, fewer than four cycles, or fewer than three cycles. Combinations of the above-referenced ranges are also possible (e.g., at least two cycles and fewer than four cycles). Other ranges are also possible. In some embodiments, the MOFs may retain 99% of the initial adsorption capacity over at least two cycles, at least three cycles, at least four cycles, or exactly five cycles. According to certain embodiments, the MOFs may retain 99% of the initial adsorption capacity over fewer than five cycles, fewer than four cycles, or fewer than three cycles. Combinations of the above-referenced ranges are also possible (e.g., at least two cycles and fewer than four cycles). Other ranges are also possible. Other combinations of adsorption efficiency and number of cycles over which it is retained are also possible.

In certain embodiments, it may be desirable to have the compound stably contained within the MOF. For example, in the case of halogens, it may be desirable to have the halogen stably contained within the MOF for storage, disposal, and/or transportation. In some embodiments, the halogen may be dissociated from the MOF upon exposure to heat.

MOFs may have any suitable morphology and may comprise any suitable components. In certain embodiments, MOFs may comprise one or more structural motifs. For example, in some embodiments, MOFs may comprise metal ions which are linked together by bridging ligands, thereby resulting in an ordered morphology. The ordered morphology may comprise features suitable for adsorption (e.g., of ammonia, of water, of halogen), such as one or more metal ions comprising open coordination sites to which a species (e.g., ammonia, water, halogen) can bind and/or pores into which a species (e.g., ammonia, water, halogen) can be adsorbed into. FIG. 1 is a schematic depiction of a cross-section of a MOF comprising metal ions 112 bridged by ligands 114 in an arrangement such that pores 116 are formed.

The metal ions may have any suitable coordination geometry and may be coordinated by any suitable species. Non-limiting examples of acceptable coordination geometries include octahedral coordination and square pyramidal coordination. In some embodiments, each of the metal ions may be coordinated by at least three bridging ligands comprising N-heterocyclic aromatic groups. In certain embodiments, each of the metal ions may be further coordinated by at least one or more auxiliary ligands, which may be bridging or terminal. In some embodiments, each of the metal ion may be coordinated by at least one bridging N-heterocyclic aromatic group, at least one bridging auxiliary ligand, and optionally one non-bridging ligand or an open coordination site. In some embodiments, each of the metal ions is coordinated by three bridging N-heterocyclic aromatic groups, two bridging auxiliary ligands, and a non-bridging auxiliary ligand or an open coordination site. In some such embodiments, a metal ion may be coordinated by three bridging ligands comprising two azolate groups (e.g., triazolate groups), two bridging auxiliary ligands (e.g., chloride ions) and a non-bridging auxiliary ligand (e.g., water) or an open coordination site. As will be known to those of skill in the art, the term bridging ligand refers to a ligand that binds between two metals ions, the two metal ions being the same or different for each bridging ligand. Open coordination sites may be in any suitable position. For example, according to certain embodiments, an open coordination site may be adjacent to a pore. Additional details regarding the metal ions, N-heterocyclic ligands, and auxiliary ligands are described herein.

Figure 2A:
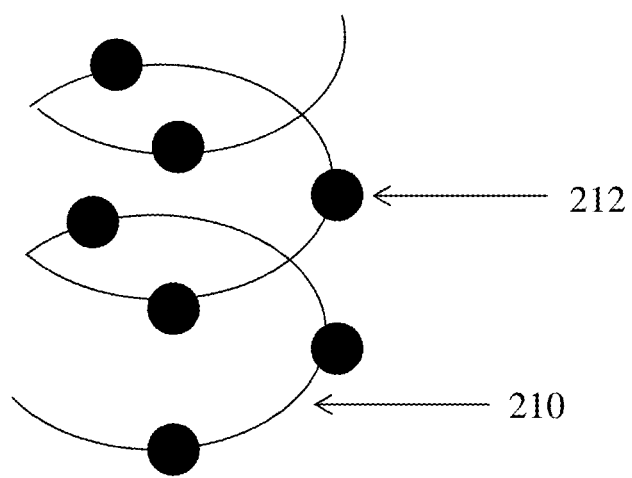
FIG. 2A shows, according to some embodiments, a schematic depiction of a three-fold helix comprising metal ions.
Figure 2B:
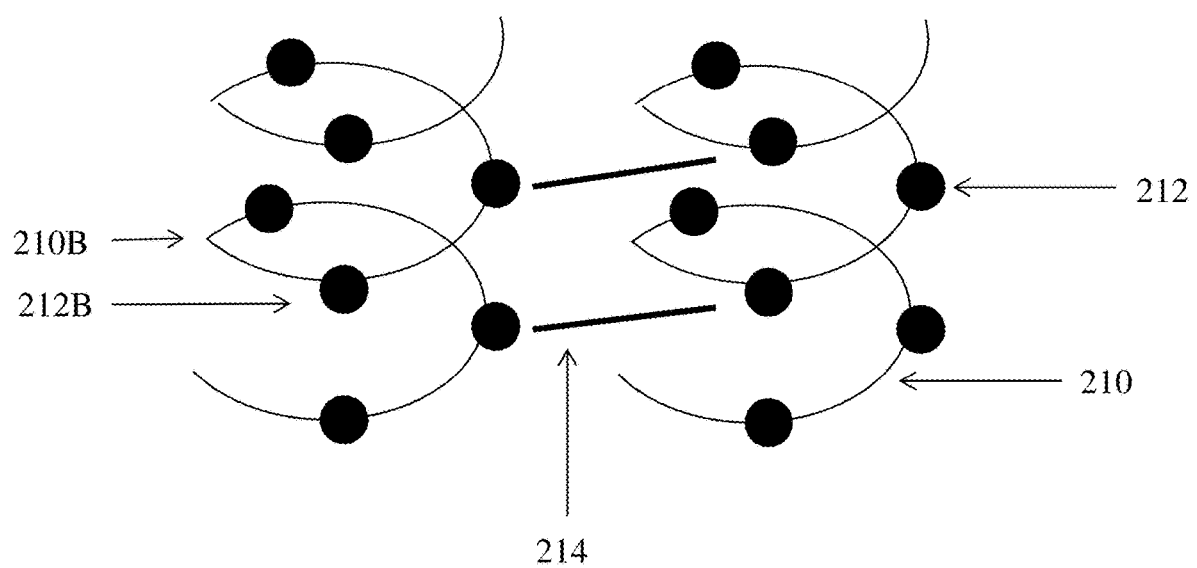
FIG. 2B shows a schematic depiction of two helices comprising metal ions which are bound together by ligands, in accordance with certain embodiments.
Figure 2C:
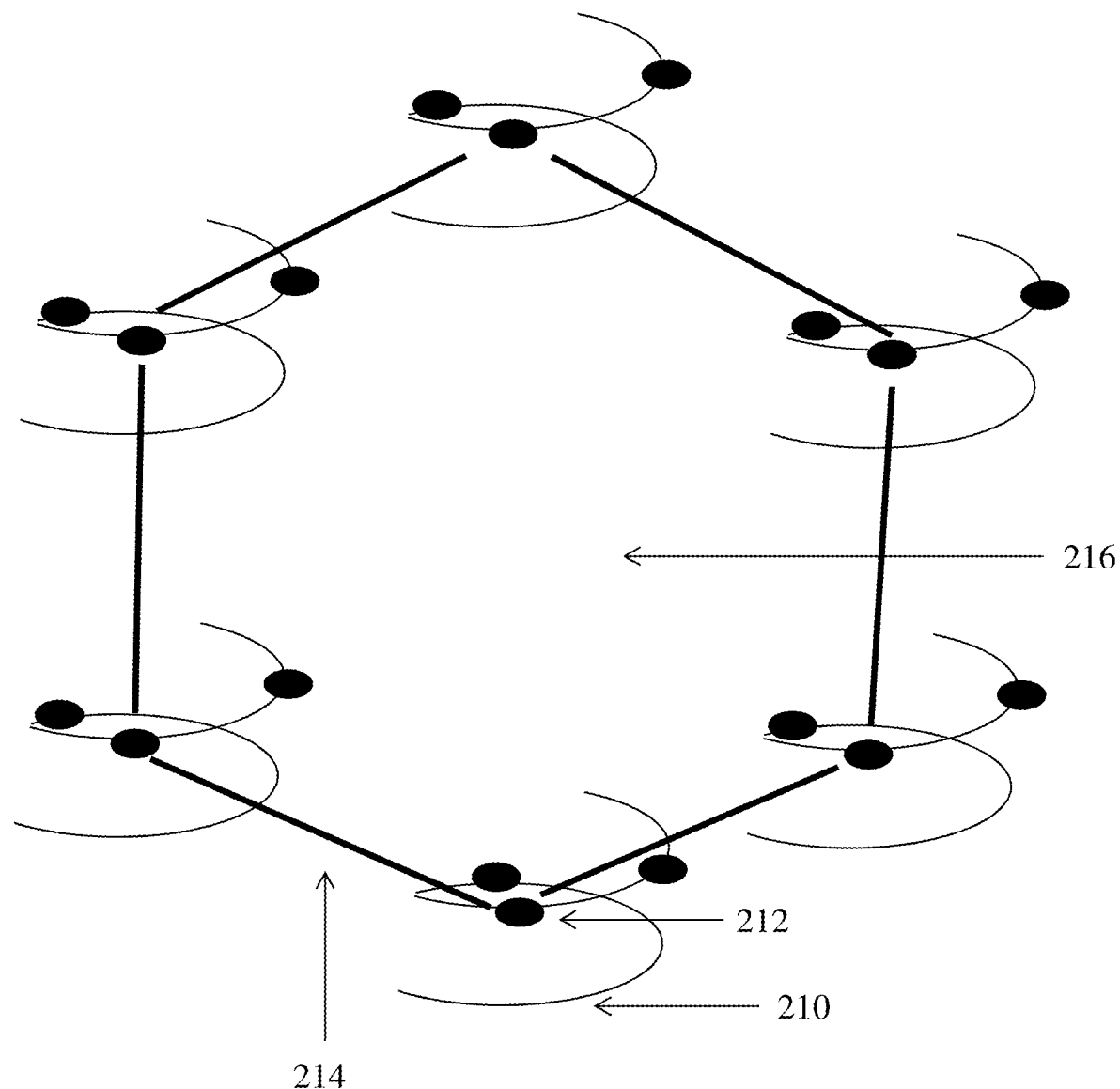
FIG. 2C shows, in accordance with certain embodiments, a schematic depiction of helices comprising metal ions which are arranged into a honeycomb lattice.

The metal ions may be arranged in any suitable way. In certain embodiments, the metal ions may be arranged into a periodic structure. For example, in some embodiments at least some of the metal ions may be arranged into one or more helices. FIG. 2A is an illustrative embodiment of a metal helix 210 comprising metal ions 212 in accordance with certain embodiments of the invention. Helix 210 may have any suitable dimensions and pitch. In certain embodiments, the MOF comprises one or more three-fold helix, where the repeat unit comprises three metal ions. In certain embodiments, metal ions within a first helix may be linked to metal ions within a second helix by ligands. For example, FIG. 2B depicts a cross-sectional view in accordance with some embodiments showing metal ions 212 on helix 210 linked to metal ions 212B on helix 210B by ligands 214. In some embodiments the ligands may be puckered inwards or outwards relative to the average flat geometry. In certain embodiments, helices may be positioned with respect to each other in an organized matter. In some embodiments, the helices may be positioned on a lattice, such as a lattice with tetragonal symmetry and/or a two-dimensional hexagonal lattice. In some embodiments, the MOF may have a crystalline structure with tetragonal symmetry comprising helices of metal ions, wherein each metal ion in the helices is associated with three of the first type of ligand and at least two auxiliary ligands, each of which bridge between two metals ions, the two metal ions being the same or different for each bridging ligand. According to certain embodiments, the two-dimensional lattice may define pores. FIG. 2C illustrates one such embodiment, where metal atoms on six different helices 210 are linked together by ligands 214 around pore 216. In some embodiments, the size of the pores may be related to the length of the ligands.

In some embodiments, the helices may be positioned such that they form a structure comprising a combination of symmetry elements consistent with one of the 230 space groups. According to certain embodiments, the MOF may have a crystal structure which is consistent with the R$\bar{3}$m space group. One of ordinary skill in the art would be familiar with methods for assessing the crystalline structure of a MOF. For example, in some embodiments, single-crystal x-ray diffraction (SC-XRD) could be used for this purpose. MOF crystals may comprise crystals with any suitable morphology. For example, in some embodiments, MOFs may comprise crystals which are hexagonal rods. One of ordinary skill in the art would be familiar with methods for determining crystal morphology. Non-limiting examples of such methods include scanning electron microscopy and optical microscopy.

In certain embodiments, the MOFs may retain their initial crystallinity and/or morphology after adsorbing a species (e.g., after adsorbing ammonia, after adsorbing water). According to some embodiments, a MOF which retains its initial crystallinity may exhibit a powder X-ray diffraction (PXRD) pattern after adsorbing a species in which the peak positions are substantially the same as those exhibited prior to adsorption of the species.

MOFs may comprise pores of any suitable morphology and size. According to certain embodiments, at least some of the pores may be through-pores, or may traverse a substantial portion of the MOF. The pores may have any suitable tortuosity; for example, substantially straight, highly curved, etc. In some embodiments, the MOFs may comprise pores which are substantially parallel to the helices. According to certain embodiments, the pores may comprise hexagonal symmetry. In some embodiments, through pores may be characterized by a cross-section perpendicular to their longest axis. Such a cross-section may have any suitable dimensions. In accordance with certain embodiments, a diameter of a pore may be defined as the diameter of a cylinder with the same length (or long axis) as the pore and the same volume as the pore. In some embodiments, an average pore diameter of a MOF may be defined as the average of the diameters of all of the pores of a MOF.

According to certain embodiments, a MOF may have an average pore diameter of greater than or equal to 5 Å, greater than or equal to 7.5 Å, greater than or equal to 10 Å, greater than or equal to 12.5 Å, greater than or equal to 15 Å, greater than or equal to 17.5 Å, greater than or equal to 20 Å, greater than or equal to 23 Å, greater than or equal to 25 Å, greater than or equal to 27.5 Å, greater than or equal to 30 Å, greater than or equal to 35 Å, greater than or equal to 40 Å, or greater than or equal to 45 Å. In some embodiments, a MOF may have an average pore diameter of less than or equal to 50 Å, less than or equal to 45 Å, less than or equal to 40 Å, less than or equal to 35 Å, less than or equal to 30 Å, less than or equal to 27.5 Å, less than or equal to 25 Å, less than or equal to 23 Å, less than or equal to 20 Å, less than or equal to 17.5 Å, less than or equal to 15 Å, less than or equal to 12.5 Å, less than or equal to 10 Å, or less than or equal to 7.5 Å. Combinations of the above-referenced ranges are also possible (e.g., greater than or equal to 20 Å and less than or equal to 25 Å). Other ranges are also possible.

One of ordinary skill in the art would be familiar with methods for determining pore size. In certain embodiments, pore size may be determined by using single crystal X-ray diffraction to calculate the positions of each atom in the MOF and using the van der Waals radius of each atom to calculate the size of the pores between the atoms.

The MOFs may have any suitable surface area. In some embodiments, the MOFs may have a surface area of greater than or equal to 500 $m^2/g$, greater than or equal to 750 $m^2/g$, greater than or equal to 1000 $m^2/g$, greater than or equal to 1250 $m^2/g$, greater than or equal to 1500 $m^2/g$, greater than or equal to 1800 $m^2/g$, greater than or equal to 2000 $m^2/g$, greater than or equal to 2250 $m^2/g$, greater than or equal to 2500 $m^2/g$, greater than or equal to 2750 $m^2/g$, greater than or equal to 3000 $m^2/g$, greater than or equal to 3250 $m^2/g$, greater than or equal to 3500 $m^2/g$, greater than or equal to 3750 $m^2/g$, greater than or equal to 4000 $m^2/g$, greater than or equal to 4500 $m^2/g$, greater than or equal to 5000 $m^2/g$, greater than or equal to 5500 $m^2/g$, greater than or equal to 6000 $m^2/g$, greater than or equal to 6500 $m^2/g$, greater than or equal to 7000 $m^2/g$, or greater than or equal to 7500 $m^2/g$. According to certain embodiments, the MOFs may have a surface area of less than or equal to 8000 $m^2/g$, less than or equal to 7500 $m^2/g$, less than or equal to 7000 $m^2/g$, less than or equal to 6500 $m^2/g$, less than or equal to 6000 $m^2/g$, less than or equal to 5500 $m^2/g$, less than or equal to 5000 $m^2/g$, less than or equal to 4500 $m^2/g$, less than or equal to 4000 $m^2/g$, less than or equal to 3750 $m^2/g$, less than or equal to 3500 $m^2/g$, less than or equal to 3250 $m^2/g$, less than or equal to 3000 $m^2/g$, less than or equal to 2750 $m^2/g$, less than or equal to 2500 $m^2/g$, less than or equal to 2250 $m^2/g$, less than or equal to 2000 $m^2/g$, less than or equal to 1800 $m^2/g$, less than or equal to 1500 $m^2/g$, less than or equal to 1250 $m^2/g$, less than or equal to 1000 $m^2/g$, or less than or equal to 750 $m^2/g$. Combinations of the above-referenced ranges are also possible (e.g., greater than or equal to 1500 $m^2/g$ and less than or equal to 2000 $m^2/g$). Other ranges are also possible. Methods for determining the surface area of a MOF will be known to those of ordinary skill in the art. For example, the surface area of a MOF may be measured by determining the Brunauer-Emmett-Teller (BET) adsorption isotherm.

According to some embodiments, the MOFs may retain a substantial fraction of their initial surface area after adsorbing a species (e.g., after adsorbing ammonia, after adsorbing water). In some embodiments, the MOFs may retain greater than or equal to 50% of their initial surface area after ammonia adsorption, greater than or equal to 75% of their initial surface area after ammonia adsorption, greater than or equal to 90% of their initial surface area after ammonia adsorption, greater than or equal to 95% of their initial surface area after ammonia adsorption, greater than or equal to 97.5% of their initial surface area after ammonia adsorption, greater than or equal to 99% of their initial surface area after ammonia adsorption, or greater than or equal to 99.9% of their initial surface area after ammonia adsorption. The initial surface area and after ammonia adsorption can be measured by any suitable means. In certain embodiments, the surface area of a MOF may be measured by the Brunauer-Emmett-Teller method (BET) for nitrogen and performing a standard calculation.

In some embodiments, the MOFs may retain greater than or equal to 50% of their initial surface area after water adsorption, greater than or equal to 75% of their initial surface area after water adsorption, greater than or equal to 90% of their initial surface area after water adsorption, greater than or equal to 95% of their initial surface area after water adsorption, greater than or equal to 97.5% of their initial surface area after water adsorption, greater than or equal to 99% of their initial surface area after water adsorption, or greater than or equal to 99.9% of their initial surface area after water adsorption. The initial surface area and after water adsorption can be measured by any suitable means. In certain embodiments, the surface area of a MOF may be measured by a Brunauer-Emmett-Teller (BET) for nitrogen and performing a standard calculation.

The MOFs may comprise any suitable metal ions which have any suitable oxidation state. Non-limiting examples of metal ion oxidation states include +2 (monovalent metal ions), +3 (trivalent metal ions), and +4 (tetravalent metal ions). Each metal ion may be divalent or trivalent, or tetravalent. In some embodiments, at least one type of metal ion is a divalent metal ion. Non-limiting examples of divalent metal ions are $Mg^{2+}$, $Mn^{2+}$, $Fe^{2+}$, $Co^{2+}$, $Ni^{2+}$, $Cu^{2+}$, $Cd^{2+}$, $Cr^{2+}$, $V^{2+}$, $Ca^{2+}$, $Be^{2+}$, $Mo^{2+}$, and $W^{2+}$. In some cases, at least one type of metal ion is $Mn^{2+}$, $Co^{2+}$, $Ni^{2+}$, or $Cu^{2+}$. In some embodiments, at least one type of metal ion is a trivalent metal ion. Non-limiting examples of trivalent metal ions are $Fe^{3+}$, $Mn^{3+}$, $V^{3+}$, $W^{3+}$, $Co^{3+}$, and $Cr^{3+}$. In certain embodiments, the metal ions comprise one or more of $Mg^{2+}$, $Mn^{2+}$, $Mn^{3+}$, $Fe^{2+}$, $Fe^{3+}$, $Co^{2+}$, $Co^{3+}$, $Ni^{2+}$, $Cu^{2+}$, $Cd^{2+}$, $Cr^{2+}$, $Cr^{3+}$, $V^{2+}$, $V^{3+}$, $Ca^{2+}$, $Be^{2+}$, $Mo^{2+}$, $Mo^{3+}$, $W^{2+}$, and $W^{3+}$. According to some embodiments, the metal ions comprise one or more of $Mn^{2+}$, $Co^{2+}$, $Ni^{2+}$, and $Cu^{2+}$.

In accordance with some embodiments, metal ions may be linked together by ligands comprising unsaturated N-heterocyclic aromatic groups. In certain embodiments, ligands comprising unsaturated N-heterocyclic aromatic groups may link together metal ions on two different helices. In some embodiments, the N-heterocyclic metal binding group may comprise a nitrogen atom. For example, non-limiting examples of suitable unsaturated N-heterocyclic aromatic groups comprising a nitrogen atom include azolate groups. As used herein, azolate groups are negatively-charged five-membered heterocyclic compounds containing at least two non-carbon atoms, at least one of which is a nitrogen atom. Examples of azolate groups include imidazolate groups, triazolate groups, tetrazolate groups, pyrazolate groups, thiazolate groups, oxadiazolate groups, and purinate groups. In certain embodiments, the unsaturated N-heterocyclic aromatic groups are triazolates. Non-limiting examples of triazolates include 1,2,4-triazolate and 1,2,3-triazolate. In some embodiments, the combination of such binding groups with metal ions may confer water and ammonia to the resulting MOFs. According to certain embodiments, ligands may comprise non-azolate N-heterocyclic aromatic groups such as pyridinate groups, quinolonate groups, and indolate groups.

In certain embodiments, a ligand may comprise two different N-heterocyclic aromatic groups. For example, in some embodiments, a ligand may comprise at least one triazolate and at least one tetrazolate (e.g., one triazolate and one tetrazolate). In some embodiments, a ligand may comprise two identical N-heterocyclic aromatic groups. For instance, in certain embodiments a ligand may comprise two triazolate groups. Other N-heterocyclic aromatic groups described herein, and/or combinations of two or more N-heterocyclic aromatic groups described herein, are also possible.

Ligands may comprise azolate groups linked together in any suitable way. In certain embodiments, the azolate groups may be linked together by a linear linkage such that a ligand comprises exactly two azolate groups. According to some embodiments, the azolate groups may be arranged about any suitable organic core. In some embodiments, the core is aromatic. Generally, the core comprises a rigid structure formed from fused aryl and/or heteroaryl rings. In some embodiments, the organic core comprises a plurality of fused aryl and/or heteroaryl rings. In some cases, the organic core comprises a plurality of fused aryl rings. In some cases, the organic core comprises one or more of benzyl, thiophenyl, carbazolyl, pyrrolyl, indolyl, and furanyl. Examples of suitable linear ligands are described in more detail below.

In some embodiments, more than one type of ligand comprising at least two unsaturated N-heterocyclic aromatic groups may be employed, for example, a first type of ligand and a second type of ligand. The two or more types of ligands may be provided in any suitable ratio. As described herein, the ligand may comprise any combination of unsaturated N-heterocyclic aromatic groups (e.g., at least one triazolate; a combination of triazolates and tetrazolates; at least one tetrazolate, etc.)

In some embodiments, the at least one ligand comprises a structure as in:

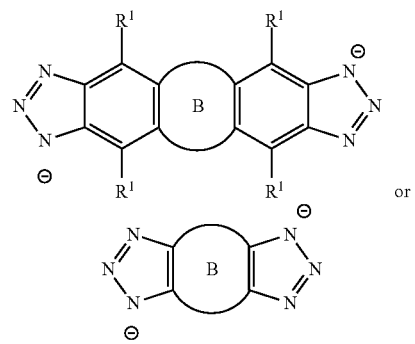

wherein B is an aromatic or heterocyclic core (e.g., comprising one or more aromatic rings, e.g. B can be biphenyl), wherein each $R^1$ is the same or different and is selected from the group consisting of hydrogen (—H), -alkyl (e.g., —$CH_3$), —$NO_2$, —R', —F, —Cl, —Br, —I, —CN, —NC, —$SO_3$R', —$SO_3$H, —OR', —OH, —SR', —SH, —$PO_3$R', —$PO_3$H, —$CF_3$, —NR'$_2$, —NHR', and —$NH_2$, wherein each R' is the same or different and is optionally substituted alkyl or optionally substituted aryl. In some embodiments, each $R^1$ is the same and is hydrogen. Non-limiting examples of such ligands include:

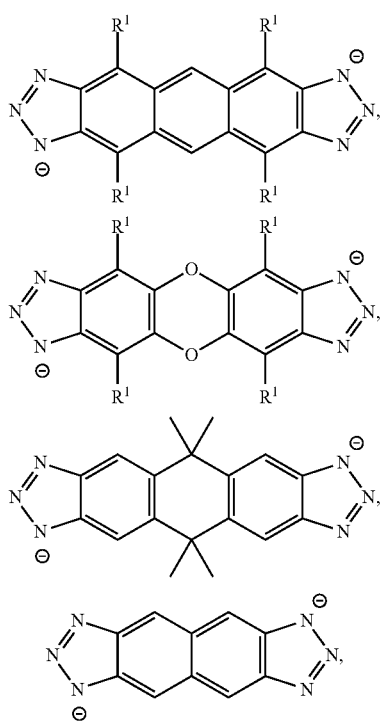

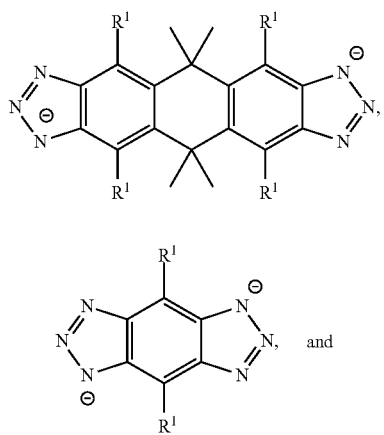

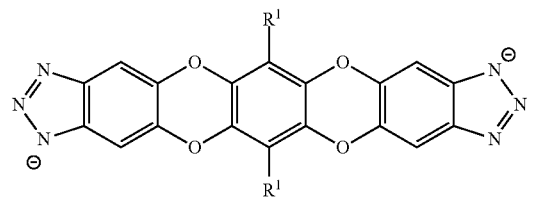

wherein each $R^1$ is the same or different and is selected from the group consisting of hydrogen, —$NO_2$, —R', —F, —Cl, —Br, —I, —CN, —NC, —$SO_3$R', —$SO_3$H, —OR', —COOR', —OH, —SR', —S(O)R, —$SO_2$R, —SH, —PO(OR)$_3$, —$PO_3$R', —$PO_3$H, —$CF_3$, —NR'$_2$, —NR$_3^+$, —NHR', and —$NH_2$, wherein each R' is the same or different and is optionally substituted alkyl or optionally substituted aryl. In some embodiments, each $R^1$ is the same and hydrogen. In some embodiments, each $R^1$ is the same or different and is hydrogen, —F, —Cl, —Br, or —I.

In some embodiments, the ligand comprises the structure:

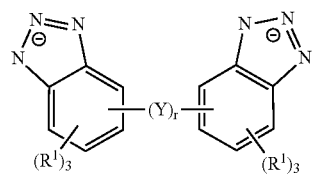

wherein each $R^1$ is the same or different and is selected from the group consisting of hydrogen, —$NO_2$, —R', —F, —Cl, —Br, —I, —CN, —NC, —$SO_3$R', —$SO_3$H, —OR', —COOR', —OH, —SR', —S(O)R, —$SO_2$R, —SH, —PO(OR)$_3$, —$PO_3$R', —$PO_3$H, —$CF_3$, —NR'$_2$, —NR$_3^+$, —NHR', and —$NH_2$, wherein each R' is the same or different and is optionally substituted alkyl or optionally substituted aryl, wherein each Y is independently alkylene, heteroalkylene, arylene, heteroarylene, —O—, —C(=O), —S—, and r is 0, 1, 2, or 3. In some embodiments, r is 0. In some embodiments, each $R^1$ is hydrogen.

In some embodiments, the ligand has the structure:

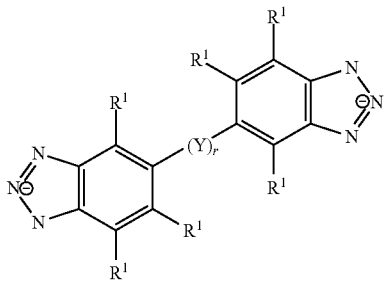

In some embodiments, r is 0. In some embodiments, each $R^1$ is H. In some embodiments, r is 0 and each $R^1$ is hydrogen.

In some embodiments, the ligand comprising the N-heterocyclic aromatic group has a structure as in Formula (I):

(I)

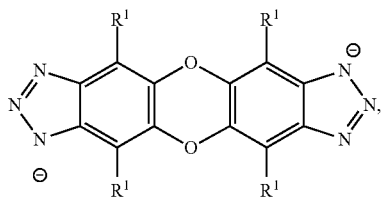

wherein each $R^1$ is the same or different and is selected from the group consisting of hydrogen, —$NO_2$, —R', —F, —Cl, —Br, —I, —CN, —NC, —$SO_3$R', —$SO_3$H, —OR', —COOR', —OH, —SR', —S(O)R, —$SO_2$R, —SH, —PO(OR)$_3$, —$PO_3$R', —$PO_3$H, —$CF_3$, —NR'$_2$, —NR$_3^+$, —NHR', and —$NH_2$, and each R' is the same or different and is optionally substituted alkyl or optionally substituted aryl. In some embodiments, the metal ions are bound to three unsaturated N-heterocyclic aromatic groups having a structures as in Formula (I). In some embodiments, each $R^1$ is hydrogen; such a structure may also be referred to herein as "BTDD".

In some embodiments, the ligand has the structure:

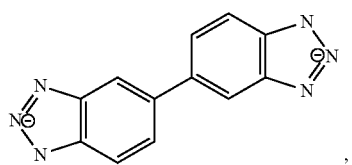

also referred to herein as "bibta".

In some embodiments, the ligand has the structure:

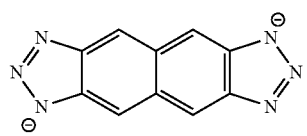 [SMILES: c1c2cc3[n-]nnc3cc2cc2[n-]nnc12]

also referred to herein as "NBTA".

In some embodiments, the ligand has the structure:

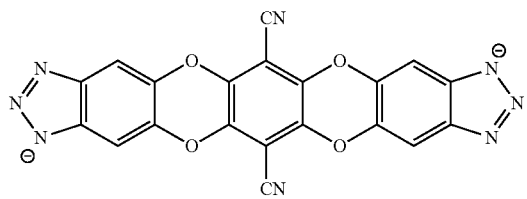 [SMILES: N#Cc1c2oc3cc4nn[n-]c4cc3oc2c(C#N)c2oc3cc4nn[n-]c4cc3oc12]

also referred to herein as "DBT-XL".

In some embodiments, the ligands may comprise one or more of bis(1H-1,2,3-triazolo[4,5-b],[4',5'-i])dibenzo[1,4]dioxin, benzo(1,2-d:4,5-d')bistriazole, 6,6,14,14-tetramethyl-6,14-dihydroquinoxalino[2,3-b]phenazinebistriazole, and 5,5'-bibenzotriazole. According to certain embodiments, the ligands may comprise bis(1H-1,2,3-triazolo[4,5-b],[4', 5'-i])dibenzo[1,4]dioxin.

According to certain embodiments, the ligands may further comprise one or more of functional groups that may aid in the uptake of a species (e.g., ammonia, water, halogen). For example, ammonia, water, and/or halogen molecules may associate with the functional groups. In some embodiments, the functional groups are hydrophilic or hydrophobic. Non-limiting examples of functional groups include —NR$_2$, —OR, —COOR, —PO(OR)$_3$, —NR$_3^+$, SR, S(O)R, and —SO$_2$R, wherein each R is independently absent, hydrogen, optionally substituted alkyl, or optionally substituted aryl.

In some embodiments, following synthetic modification of a MOF or a precursor ligand which is to be utilized to form a MOF, a mixture of types of ligands (or precursor ligands) may be present. For example, the ligands within the MOF or a plurality of precursor ligands that will be used to form a MOF may be synthetically modified (e.g., oxidized) and only a portion of the substituents of the ligands or precursor ligands may be altered. Thus, the ligands within the MOF or the precursor ligands used to form the MOF may comprise a number of different substitution patterns. As a non-limiting example, if the ligand (or precursor ligand) comprises two substituents that are targeted to be modified, upon modification of a plurality of the ligands, for each ligand within the plurality, both substituents may be modified, or only one substituent may be modified, or neither substituent may be modified. Thus, the plurality of ligands may comprise some ligands with both substituents modified, some ligands with only one substituent modified, and some ligands with neither substituent modified.

According to certain embodiments, the MOFs may further comprise at least one auxiliary ligand such as an anion and/or a coordinating solvent. Non-limiting examples of anions include halides (e.g., chloride, fluoride, bromide, and/or iodide anions), and other negatively charged groups (e.g., nitrite, sulfite, triflate, BF$_4^-$, PF$_6^-$, NO$_3^-$, SO$_4^{2-}$, ClO$_4^-$, nitrate, carbonate, and sulfonate groups). In some embodiments, one or more auxiliary ligands may be incorporated into one or more metal ion helices and/or may coordinate more than one metal ion within a single helix. For example, in certain embodiments metal ions may be arranged into helices which further comprise chloride ions. In some embodiments, auxiliary ligands may comprise coordinating solvents, such as water, pyridine, tetrahydrofuran, diethyl ether, tetrahydrofuran, ammonia, toluene, and/or benzene.

The MOFs may be synthesized using methods known in the art (e.g., see *Chem Eur. J.* 2014, 20, 11303). For example, in some cases, a method of synthesizing a MOF comprises exposing a plurality of metal ions to a plurality of precursor ligands to form a MOF comprising a portion of the plurality of metal ions each coordinated with at least one ligand, wherein the at least one ligand comprises at least two unsaturated N-heterocyclic aromatic groups arranged about an organic core. Non-limiting examples of ligands comprises at least unsaturated N-heterocyclic aromatic groups arranged about an organic core are described herein. In some embodiments, the metal ion is provided as a salt, and the at least one precursor ligand comprises at least two N-heterocyclic aromatic groups which, during the course of the reaction are deprotonated to form the corresponding ligand (e.g., comprising unsaturated N-heterocyclic aromatic groups). For example, the precursor ligand may be deprotonated to have a charge of (−2). Exemplary precursor ligands are described herein.

In some embodiments, the MOFs formed may comprise little or no excess metal ions. That is, the MOF comprises essentially no metal ions which are not coordinated with a ligand comprising at least two unsaturated N-heterocyclic aromatic groups (i.e., "free metal ions"). In some embodiments, the MOF comprises less than about 0.5 wt %, or less then about 0.4 wt %, or less then about 0.3 wt %, or less than about 0.2 wt %, or less then about 0.1 wt %, or less than about 0.05 wt %, or less than about 0.03 wt %, or less than about 0.02 wt %, or less than about 0.01 wt %, or less than about 0.005 wt %, or less than about 0.001 wt % of free metal ions. Those of ordinary skill in the art will be aware of methods for determining the amount of free metal ions, for example, using XPS.

In some embodiments, each precursor ligand comprises two N-heterocyclic aromatic groups. In some embodiments, the N-heterocyclic aromatic groups are selected azole groups, which may be defined as five-membered heterocyclic compounds containing at least two non-carbon atoms, at least one of which must be a nitrogen atom. Examples of azole groups include imidazole groups, triazole groups, tetrazole groups, pyrazole groups, thiazole groups, oxadiazole groups, and purine groups. In certain embodiments, the unsaturated N-heterocyclic aromatic groups are triazoles. Non-limiting examples of triazoles include 1,2,4-triazole and 1,2,3-triazole. In some embodiments, the combination of such binding groups with metal ions may confer water and ammonia stability to the resulting MOFs. According to certain embodiments, ligands may comprise non-azole N-heterocyclic aromatic groups such as pyridine groups quinolone groups, and indole groups. In some embodiments, the combination of such binding groups with metal ions may confer water and ammonia stability to the resulting MOFs.

In certain embodiments, a precursor ligand may comprise two different N-heterocyclic aromatic groups. For example, in some embodiments, a precursor ligand may comprise at least one triazole and at least one tetrazole (e.g., one triazole and one tetrazole). In some embodiments, a precursor ligand may comprise two identical N-heterocyclic aromatic groups. For instance, in certain embodiments a precursor ligand may comprise two triazole groups. Other N-heterocyclic aromatic groups described herein, and/or combinations of two or more N-heterocyclic aromatic groups described herein, are also possible.

Precursor ligands may comprise azolate groups linked together in any suitable way. In certain embodiments, the azolate groups may be linked together by a linear linkage such that a ligand comprises exactly two azolate groups. According to some embodiments, the azolate groups may be arranged about any suitable organic core. In some embodiments, the core is aromatic. Generally, the core comprises a rigid structure formed from fused aryl and/or heteroaryl rings. In some embodiments, the organic core comprises a plurality of fused aryl and/or heteroaryl rings. In some cases, the organic core comprises a plurality of fused aryl rings. In some cases, the organic core comprises one or more of benzyl, thiophenyl, carbazolyl, pyrrolyl, indolyl, and furanyl. Examples of suitable linear precursor ligands are described in more detail below.

In some embodiments, more than one type of precursor ligand comprising at least two unsaturated N-heterocyclic aromatic groups may be employed, for example, a first type of precursor ligand and a second type of precursor ligand. The two or more types of precursor ligands may be provided in any suitable ratio. As described herein, the precursor ligand may comprise any combination of unsaturated N-heterocyclic aromatic groups (e.g., at least one triazolate; a combination of triazolates and tetrazolates; at least one tetrazolate, etc.)

In some embodiments, each precursor ligand has the structure:

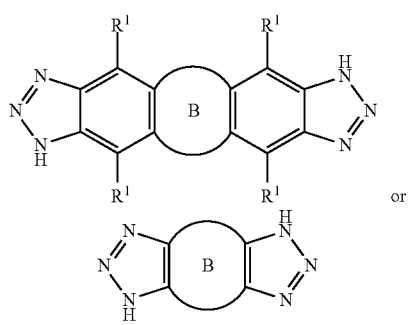

wherein B is an aromatic or heterocyclic core, wherein each $R^1$ is the same or different and is selected from the group consisting of hydrogen (—H), -alkyl (e.g., —CH$_3$), —NO$_2$, —R', —F, —Cl, —Br, —I, —CN, —NC, —SO$_3$R', —SO$_3$H, —OR', —OH, —SR', —SH, —PO$_3$R', —PO$_3$H, —CF$_3$, —NR'$_2$, —NHR', and —NH$_2$, wherein each R' is the same or different and is optionally substituted alkyl or optionally substituted aryl. In some embodiments, each $R^1$ is the same and is hydrogen. Non-limiting examples of such ligands include:

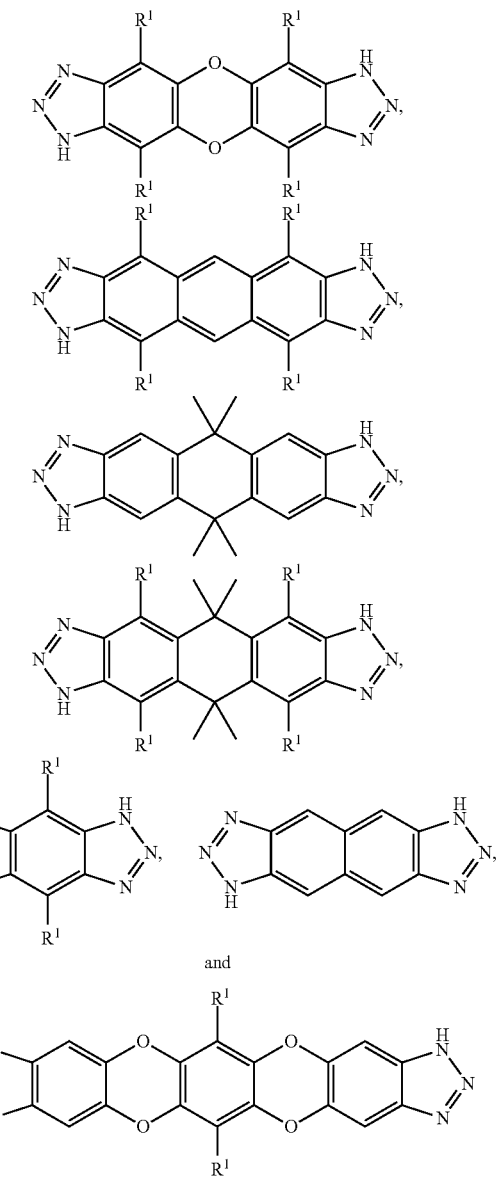

wherein each $R^1$ is the same or different and is selected from the group consisting of hydrogen, —NO$_2$, —R', —F, —Cl, —Br, —I, —CN, —NC, —SO$_3$R', —SO$_3$H, —OR', —COOR', —OH, —SR', —S(O)R, —SO$_2$R, —SH, —PO(OR)$_3$, —PO$_3$R', —PO$_3$H, —CF$_3$, —NR'$_2$, —NR$_3^+$, —NHR', and —NH$_2$, wherein each R' is the same or different and is optionally substituted alkyl or optionally substituted aryl. In some embodiments, each $R^1$ is the same and hydrogen.

In some embodiments, the ligand comprises the structure:

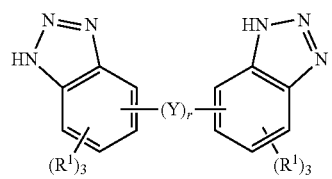

wherein each $R^1$ is the same or different and is selected from the group consisting of hydrogen, —$NO_2$, —R', —F, —Cl, —Br, —I, —CN, —NC, —$SO_3R'$, —$SO_3H$, —OR', —COOR', —OH, —SR', —S(O)R, —SO2R, —SH, —PO$(OR)_3$, —$PO_3R'$, —$PO_3H$, —$CF_3$, —$NR'_2$, —$NR_3^+$, —NHR', and —$NH_2$, wherein each R' is the same or different and is optionally substituted alkyl or optionally substituted aryl, wherein each Y is independently alkylene, heteroalkylene, arylene, heteroarylene, —O—, —C(=O), —S—, and r is 0, 1, 2, or 3. In some embodiments, r is 0. In some embodiments, each $R^1$ is hydrogen.

In some embodiments, the precursor ligand has the structure:

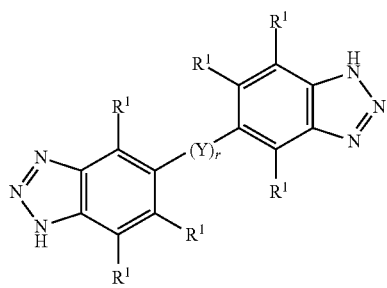

In some embodiments, r is 0. In some embodiments, each $R^1$ is H. In some embodiments, r is 0 and each $R^1$ is hydrogen.

In some embodiments, the ligand comprising the N-heterocyclic aromatic group has a structure as in Formula (II):

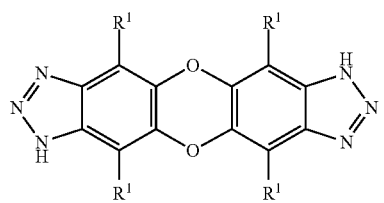

wherein each $R^1$ is the same or different and is selected from the group consisting of hydrogen, —$NO_2$, —R', —F, —Cl, —Br, —I, —CN, —NC, —$SO_3R'$, —$SO_3H$, —OR', —COOR', —OH, —SR', —S(O)R, —$SO_2R$, —SH, —PO$(OR)_3$, —$PO_3R'$, —$PO_3H$, —$CF_3$, —NR', —$NR_3^+$, —NHR', and —$NH_2$, and each R' is the same or different and is optionally substituted alkyl or optionally substituted aryl. In some embodiments, the metal ions are bound to three unsaturated N-heterocyclic aromatic groups having a structures as in Formula (II). In some embodiments, each $R^1$ is hydrogen; such a structure may also be referred to herein as "$H_2BTDD$".

In some embodiments, the precursor ligand has the structure:

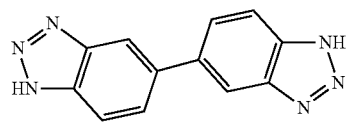

also referred to herein as "$H_2$bibta".

In some embodiments, the precursor ligand has the structure:

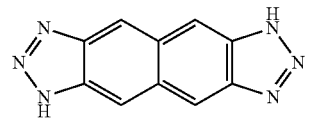 [SMILES: c1c2cc3[nH]nnc3cc2cc2[nH]nnc12]

also referred to herein as "$H_2NBTA$",

In some embodiments, the precursor ligand has the structure:

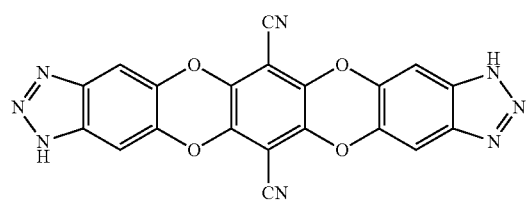 [SMILES: N#Cc1c2oc3cc4nn[nH]c4cc3oc2c(C#N)c2oc3cc4nn[nH]c4cc3oc12]

also referred to herein as "$H_2DBT-XL$".

In some embodiments, the precursor ligand may have the structure:

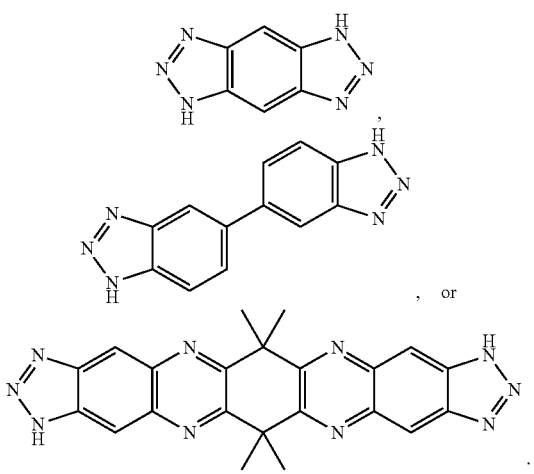

According to certain embodiments, the precursor ligands may further comprise one or more of functional groups that may aid in the uptake of a species (e.g., ammonia, water, halogen). For example, the ammonia molecules may associate with the functional groups. In some embodiments, the functional groups are hydrophilic or hydrophobic. Non-limiting examples of functional groups include —$NR_2$, —OR, —COOR, —PO$(OR)_3$, —$NR_3^+$, SR, S(O)R, and —$SO_2R$, wherein each R is independently absent, hydrogen, optionally substituted alkyl, or optionally substituted aryl.

The metal ion and the ligand may be provided in any suitable amounts. In some embodiments, the mole ratio of the metal ion to the ligand may be based upon the coordination of the metal ion to the ligand. For example, in embodiments, where the ligand is coordinated with three metal ions, and each metal ion is associated with two ligands, the mole ratio of the metal ion to the ligand may be at least 3:2. As another example, in embodiments, where the ligand is coordinated with two metal ions, and each metal ion is associated with one ligand, the mole ratio of the metal ion to the precursor ligand may about 2:1. In some embodiments, the ligand is providing in slight mole excess.

In some embodiments, the metal ions are provided as a salt or as the hydrate of a salt. Non-limiting examples of salts chloride, fluoride, bromide, iodide, triflate, $BF_4^-$, $PF_6^-$, $NO_3^-$, $SO_4^{2-}$, and $ClO_4^-$ salts. In some cases, the salt is a $Cl^-$ salt. According to certain embodiments, the salt is a metal chloride hydrate.

Any suitable solvent may be utilized in the synthetic methods of forming the MOFs described herein. Non-limiting examples of solvents include water, methanol, ethanol, propanol, benzene, p-cresol, toluene, xylene, diethyl ether, glycol, diethyl ether, petroleum ether, hexane, cyclohexane, pentane, methylene chloride, chloroform, carbon tetrachloride, dioxane, tetrahydrofuran (THF), dimethyl sulfoxide (DMSO), dimethylformamide (DMF), hexamethylphosphoric triamide, ethyl acetate, pyridine, triethylamine, picoline, mixtures thereof, or the like. In some embodiments, MOFs may be synthesized in a blend of one or more solvents (e.g., a blend of dimethylformamide and ethanol).

The MOFs may be synthesized at any suitable temperature. In some cases, the reaction is carried out at about room temperature (e.g., about 25° C., about 20° C., between about 20° C. and about 25° C., or the like). In some cases, however, the reaction is carried out at temperatures below or above room temperature. In some embodiments, the reaction is carried at a temperature between about 25° C. and about 200° C., about 25° C. and about 150° C., or between about 50° C. and about 200° C., or between about 50° C. and about 150° C., or between about 100° C. and about 150° C. According to certain embodiments, the reaction is carried out at 65° C.

In some embodiments, the MOFs may be synthesized in the presence of an acid or a base (e.g., to aid in the protonation or deprotonation of a ligand). Non-limiting examples of bases include $NR''_3$ wherein each R'' is the same or different and is hydrogen, optionally substituted alkyl, or optionally substituted aryl, and QOH, wherein Q is a cation (e.g., a metal cation, a semi-metal cation, $NH_4$). Non-limiting examples of acids include mineral acids and hydrohalic acids. In some embodiments, the acid is hydrochloric acids. In some embodiments, the MOFs may be synthesized in a 50:50:1 mixture of dimethylformamide:ethanol:hydrochloric acid using two equivalents of a metal dichloride salt.

In some embodiments, the MOFs may be synthesized in an inert atmosphere. For example, the reactions may be carried out in or under an inert nitrogen or argon atmosphere (e.g., using standard Schlenk techniques and/or in an inert-atmosphere glovebox).

According to certain embodiments, the MOFs may be synthesized over any period of time. For example, in some embodiments, the MOFs may be exposed to the synthesis conditions for a time period of greater than or equal to one day, greater than or equal to two days, greater than or equal to four days, greater than or equal to seven days, greater than or equal to ten days, greater than or equal to two weeks, greater than or equal to three weeks, greater than or equal to four weeks, greater than or equal to six weeks, or greater than or equal to eight weeks. In certain embodiments, the MOFs may be exposed to the synthesis conditions for a time period of less than or equal to twelve weeks, less than or equal to eight weeks. Less than or equal to six weeks, less than or equal to four weeks, less than or equal to three weeks, less than or equal to two weeks, less than or equal to ten days, less than or equal to seven days, less than or equal to four days, or less than or equal to two days. Combinations of the above-referenced ranges are also possible (e.g., greater than or equal to two weeks and less than or equal to three weeks). Other ranges are also possible.

MOFs synthesized using the methods described herein may be purified using techniques known to those of ordinary skill in the art. In some embodiments, a synthesized MOF may be washed, sometimes involving a Soxhlet extractor, boiled, and/or sonicated (e.g., to remove excess starting materials).

In some embodiments, following synthesis of the MOF, the MOF may be modified. For example, the ligands of the MOF may be modified to include one or more functional groups and/or the one or more of the functional groups of the ligand may be modified. The ability to modify in the MOF following synthesis of the MOF is beneficial as the properties of the MOFs may be more readily tuned. In some embodiments, the MOF is modified to include hydrophilic groups. The MOF may be modified using any suitable technique. In some embodiments, the MOF is exposed to oxidative conditions to associate new functional groups and/or modify currently present functional groups that are present on the ligand of the MOF. As a non-limiting example, a ligand of the MOF may comprise one or more alkyl or aryl sulfide groups (—SR, R=H, methyl, propyl, butyl, phenyl, etc.), and the MOF may be exposed to oxidizing conditions (e.g., dimethyldioxirane) to generate mixtures of sulfide, sulfoxide, and sulfone groups.

In some embodiments, a method for adsorption and/or a related system may comprise one or more MOFs. For example, a system or method may comprise a first type of MOF and second type of MOF. The MOFs may differ in their pore size. In some embodiments, a system or method may two adsorbent beds, a first bed comprising an MOF with a smaller pore size and a second bed comprising a second MOF with a larger pore size. The method of use may comprise heated the first bed to release water to the condenser. In some embodiments, simultaneously or substantially simultaneously, adsorption of water with the initially dry second bed may drive evaporation at a low pressure, leading to cooling in the evaporator. In the second half of the cycle, adsorption in the first bed may lead to cooling in the evaporator, meanwhile, the released heat from the first bed desorbs the second bed, requiring no additional energy for desorption.

Definitions

For convenience, certain terms employed in the specification, examples, and appended claims are listed here.

As used herein, the term "reacting" refers to the forming of a bond between two or more components to produce a stable, isolable compound. For example, a first component and a second component may react to form one reaction product comprising the first component and the second component joined by a covalent bond. That is, the term "reacting" does not refer to the interaction of solvents, catalysts, bases, ligands, or other materials which may serve to promote the occurrence of the reaction with the component(s).

Definitions of specific functional groups and chemical terms are described in more detail below. For purposes of this invention, the chemical elements are identified in accordance with the Periodic Table of the Elements, CAS version, *Handbook of Chemistry and Physics*, 75$^{th}$ Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito: 1999, the entire contents of which are incorporated herein by reference.

The term "aliphatic," as used herein, includes both saturated and unsaturated, nonaromatic, straight chain (i.e., unbranched), branched, acyclic, and cyclic (i.e., carbocyclic) hydrocarbons, which are optionally substituted with one or more functional groups. As will be appreciated by one of ordinary skill in the art, "aliphatic" is intended herein to include, but is not limited to, alkyl, alkenyl, alkynyl, cycloalkyl, cycloalkenyl, and cycloalkynyl moieties. Thus, as used herein, the term "alkyl" includes straight, branched and cyclic alkyl groups. An analogous convention applies to other generic terms such as "alkenyl", "alkynyl", and the like. Furthermore, as used herein, the terms "alkyl", "alkenyl", "alkynyl", and the like encompass both substituted and unsubstituted groups. In certain embodiments, as used herein, "aliphatic" is used to indicate those aliphatic groups (cyclic, acyclic, substituted, unsubstituted, branched or unbranched) having 1-20 carbon atoms. Aliphatic group substituents include, but are not limited to, any of the substituents described herein, that result in the formation of a stable moiety (e.g., aliphatic, alkyl, alkenyl, alkynyl, heteroaliphatic, heterocyclic, aryl, heteroaryl, acyl, oxo, imino, thiooxo, cyano, isocyano, amino, azido, nitro, hydroxyl, thiol, halo, aliphaticamino, heteroaliphaticamino, alkylamino, heteroalkylamino, arylamino, heteroarylamino, alkylaryl, arylalkyl, aliphaticoxy, heteroaliphaticoxy, alkyloxy, heteroalkyloxy, aryloxy, heteroaryloxy, aliphaticthioxy, heteroaliphaticthioxy, alkylthioxy, heteroalkylthioxy, arylthioxy, heteroarylthioxy, acyloxy, and the like, each of which may or may not be further substituted).

As used herein, the term "alkyl" is given its ordinary meaning in the art and refers to the radical of saturated aliphatic groups, including straight-chain alkyl groups, branched-chain alkyl groups, cycloalkyl (alicyclic) groups, alkyl substituted cycloalkyl groups, and cycloalkyl substituted alkyl groups. In some cases, the alkyl group may be a lower alkyl group, i.e., an alkyl group having 1 to 10 carbon atoms (e.g., methyl, ethyl, propyl, butyl, pentyl, hexyl, heptyl, octyl, nonyl, or decyl). In some embodiments, a straight chain or branched chain alkyl may have 30 or fewer carbon atoms in its backbone, and, in some cases, 20 or fewer. In some embodiments, a straight chain or branched chain alkyl may have 12 or fewer carbon atoms in its backbone (e.g., $C_1$-$C_{12}$ for straight chain, $C_3$-$C_{12}$ for branched chain), 6 or fewer, or 4 or fewer. Likewise, cycloalkyls may have from 3-10 carbon atoms in their ring structure, or 5, 6 or 7 carbons in the ring structure. Examples of alkyl groups include, but are not limited to, methyl, ethyl, propyl, isopropyl, cyclopropyl, butyl, isobutyl, t-butyl, cyclobutyl, hexyl, and cyclohexyl.

The term "alkylene" as used herein refers to a bivalent alkyl group. An "alkylene" group is a polymethylene group, i.e., —$(CH_2)_z$—, wherein z is a positive integer, e.g., from 1 to 20, from 1 to 10, from 1 to 6, from 1 to 4, from 1 to 3, from 1 to 2, or from 2 to 3. A substituted alkylene chain is a polymethylene group in which one or more methylene hydrogen atoms are replaced with a substituent. Suitable substituents include those described herein for a substituted aliphatic group.

Generally, the suffix "-ene" is used to describe a bivalent group. Thus, any of the terms defined herein can be modified with the suffix "-ene" to describe a bivalent version of that moiety. For example, a bivalent carbocycle is "carbocyclylene", a bivalent aryl ring is "arylene", a bivalent benzene ring is "phenylene", a bivalent heterocycle is "heterocyclene", a bivalent heteroaryl ring is "heteroarylene", a bivalent alkyl chain is "alkylene", a bivalent alkenyl chain is "alkenylene", a bivalent alkynyl chain is "alkynylene", a bivalent heteroalkyl chain is "heteroalkylene", a bivalent heteroalkenyl chain is "heteroalkenylene", a bivalent heteroalkynyl chain is "heteroalkynylene", and so forth.

The terms "alkenyl" and "alkynyl" are given their ordinary meaning in the art and refer to unsaturated aliphatic groups analogous in length and possible substitution to the alkyls described above, but that contain at least one double or triple bond respectively.

In certain embodiments, the alkyl, alkenyl and alkynyl groups employed in the invention contain 1-20 aliphatic carbon atoms. In certain other embodiments, the alkyl, alkenyl, and alkynyl groups employed in the invention contain 1-10 aliphatic carbon atoms. In yet other embodiments, the alkyl, alkenyl, and alkynyl groups employed in the invention contain 1-8 aliphatic carbon atoms. In still other embodiments, the alkyl, alkenyl, and alkynyl groups employed in the invention contain 1-6 aliphatic carbon atoms. In yet other embodiments, the alkyl, alkenyl, and alkynyl groups employed in the invention contain 1-4 carbon atoms. Illustrative aliphatic groups thus include, but are not limited to, for example, methyl, ethyl, n-propyl, isopropyl, allyl, n-butyl, sec-butyl, isobutyl, t-butyl, n-pentyl, sec-pentyl, isopentyl, t-pentyl, n-hexyl, sec-hexyl, moieties and the like, which again, may bear one or more substituents. Alkenyl groups include, but are not limited to, for example, ethenyl, propenyl, butenyl, 1-methyl-2-buten-1-yl, and the like. Representative alkynyl groups include, but are not limited to, ethynyl, 2-propynyl (propargyl), 1-propynyl and the like.

The term "cycloalkyl," as used herein, refers specifically to groups having three to ten, preferably three to seven carbon atoms. Suitable cycloalkyls include, but are not limited to cyclopropyl, cyclobutyl, cyclopentyl, cyclohexyl, cycloheptyl and the like, which, as in the case of other aliphatic, heteroaliphatic, or heterocyclic moieties, may optionally be substituted with substituents including, but not limited to aliphatic; heteroaliphatic; aryl; heteroaryl; arylalkyl; heteroarylalkyl; alkoxy; aryloxy; heteroalkoxy; heteroaryloxy; alkylthio; arylthio; heteroalkylthio; heteroarylthio; —F; —Cl; —Br; —I; —OH; —$NO_2$; —CN; —$CF_3$; —$CH_2CF_3$; —$CHCl_2$; —$CH_2OH$; —$CH_2CH_2OH$; —$CH_2NH_2$; —$CH_2SO_2CH_3$; —$C(O)R_x$; —$CO_2(R_x)$; —$CON(R_x)_2$; —$OC(O)R_x$; —$OCO_2R_x$; —$OCON(R_x)_2$; —$N(R_x)_2$; —$S(O)_2R_x$; —$NR_x(CO)R_x$, wherein each occurrence of $R_x$ independently includes, but is not limited to, aliphatic, heteroaliphatic, aryl, heteroaryl, arylalkyl, or heteroarylalkyl, wherein any of the aliphatic, heteroaliphatic, arylalkyl, or heteroarylalkyl substituents described above and herein may be substituted or unsubstituted, branched or unbranched, cyclic or acyclic, and wherein any of the aryl or heteroaryl substituents described above and herein may be substituted or unsubstituted. Additional examples of generally applicable substituents are illustrated by the specific embodiments shown in the Examples that are described herein.

The term "heteroaliphatic," as used herein, refers to an aliphatic moiety, as defined herein, which includes both saturated and unsaturated, nonaromatic, straight chain (i.e., unbranched), branched, acyclic, cyclic (i.e., heterocyclic), or polycyclic hydrocarbons, which are optionally substituted with one or more functional groups, and that contain one or more oxygen, sulfur, nitrogen, phosphorus, or silicon atoms, e.g., in place of carbon atoms. In certain embodiments, heteroaliphatic moieties are substituted by independent replacement of one or more of the hydrogen atoms thereon with one or more substituents. As will be appreciated by one of ordinary skill in the art, "heteroaliphatic" is intended herein to include, but is not limited to, heteroalkyl, heteroalkenyl, heteroalkynyl, heterocycloalkyl, heterocycloalkenyl, and heterocycloalkynyl moieties. Thus, the term "heteroaliphatic" includes the terms "heteroalkyl," "heteroalkenyl", "heteroalkynyl", and the like. Furthermore, as used herein, the terms "heteroalkyl", "heteroalkenyl", "heteroalkynyl", and the like encompass both substituted and unsubstituted groups. In certain embodiments, as used herein, "heteroaliphatic" is used to indicate those heteroaliphatic groups (cyclic, acyclic, substituted, unsubstituted, branched or unbranched) having 1-20 carbon atoms. Heteroaliphatic group substituents include, but are not limited to, any of the substituents described herein, that result in the formation of a stable moiety (e.g., aliphatic, alkyl, alkenyl, alkynyl, heteroaliphatic, heterocyclic, aryl, heteroaryl, acyl, sulfinyl, sulfonyl, oxo, imino, thiooxo, cyano, isocyano, amino, azido, nitro, hydroxyl, thiol, halo, aliphaticamino, heteroaliphaticamino, alkylamino, heteroalkylamino, arylamino, heteroarylamino, alkylaryl, arylalkyl, aliphaticoxy, heteroaliphaticoxy, alkyloxy, heteroalkyloxy, aryloxy, heteroaryloxy, aliphaticthioxy, heteroaliphaticthioxy, alkylthioxy, heteroalkylthioxy, arylthioxy, heteroarylthioxy, acyloxy, and the like, each of which may or may not be further substituted).

The term "heteroalkyl" is given its ordinary meaning in the art and refers to an alkyl group as described herein in which one or more carbon atoms is replaced by a heteroatom. Suitable heteroatoms include oxygen, sulfur, nitrogen, phosphorus, and the like. Examples of heteroalkyl groups include, but are not limited to, alkoxy, alkoxyalkyl, amino, thioester, poly(ethylene glycol), and alkyl-substituted amino.

The terms "heteroalkenyl" and "heteroalkynyl" are given their ordinary meaning in the art and refer to unsaturated aliphatic groups analogous in length and possible substitution to the heteroalkyls described above, but that contain at least one double or triple bond respectively.

Some examples of substituents of the above-described aliphatic (and other) moieties of compounds of the invention include, but are not limited to aliphatic;

heteroaliphatic; aryl; heteroaryl; alkylaryl; alkylheteroaryl; alkoxy; aryloxy; heteroalkoxy; heteroaryloxy; alkylthio; arylthio; heteroalkylthio; heteroarylthio; F; Cl; Br; I; —OH; —NO$_2$; —CN; —CF$_3$; —CHF$_2$; —CH$_2$F; —CH$_2$CF$_3$; —CHCl$_2$; —CH$_2$OH; —CH$_2$CH$_2$OH; —CH$_2$NH$_2$; —CH$_2$SO$_2$CH$_3$; —C(O)R$_x$; —CO$_2$(R$_x$); —CON(R$_x$)$_2$; —OC(O)R$_x$; —OCO$_2$R$_x$; —OCON(R$_x$)$_2$; —N(R$_x$)$_2$; —S(O)$_2$R$_x$; —NR$_x$(CO)R$_x$ wherein each occurrence of R$_x$ independently includes, but is not limited to, aliphatic, alicyclic, heteroaliphatic, heterocyclic, aryl, heteroaryl, alkylaryl, or alkylheteroaryl, wherein any of the aliphatic, heteroaliphatic, alkylaryl, or alkylheteroaryl substituents described above and herein may be substituted or unsubstituted, branched or unbranched, cyclic or acyclic, and wherein any of the aryl or heteroaryl substituents described above and herein may be substituted or unsubstituted. Additional examples of generally applicable substituents are illustrated by the specific embodiments shown in the Examples that are described herein.

The term "aryl" is given its ordinary meaning in the art and refers to aromatic carbocyclic groups, optionally substituted, having a single ring (e.g., phenyl), multiple rings (e.g., biphenyl), or multiple fused rings in which at least one is aromatic (e.g., 1,2,3,4-tetrahydronaphthyl, naphthyl, anthryl, or phenanthryl). That is, at least one ring may have a conjugated pi electron system, while other, adjoining rings can be cycloalkyls, cycloalkenyls, cycloalkynyls, aryls and/or heterocyclyls. The aryl group may be optionally substituted, as described herein. Substituents include, but are not limited to, any of the previously mentioned substituents, i.e., the substituents recited for aliphatic moieties, or for other moieties as disclosed herein, resulting in the formation of a stable compound. In some cases, an aryl group is a stable mono- or polycyclic unsaturated moiety having preferably 3-14 carbon atoms, each of which may be substituted or unsubstituted. "Carbocyclic aryl groups" refer to aryl groups wherein the ring atoms on the aromatic ring are carbon atoms. Carbocyclic aryl groups include monocyclic carbocyclic aryl groups and polycyclic or fused compounds (e.g., two or more adjacent ring atoms are common to two adjoining rings) such as naphthyl groups.

The terms "heteroaryl" is given its ordinary meaning in the art and refers to aryl groups comprising at least one heteroatom as a ring atom. A "heteroaryl" is a stable heterocyclic or polyheterocyclic unsaturated moiety having preferably 3-14 carbon atoms, each of which may be substituted or unsubstituted. Substituents include, but are not limited to, any of the previously mentioned substituents, i.e., the substitutes recited for aliphatic moieties, or for other moieties as disclosed herein, resulting in the formation of a stable compound. In some cases, a heteroaryl is a cyclic aromatic radical having from five to ten ring atoms of which one ring atom is selected from S, O, and N; zero, one, or two ring atoms are additional heteroatoms independently selected from S, O, and N; and the remaining ring atoms are carbon, the radical being joined to the rest of the molecule via any of the ring atoms, such as, for example, pyridyl, pyrazinyl, pyrimidinyl, pyrrolyl, pyrazolyl, imidazolyl, thiazolyl, oxazolyl, isooxazolyl, thiadiazolyl, oxadiazolyl, thiophenyl, furanyl, quinolinyl, isoquinolinyl, and the like.

It will also be appreciated that aryl and heteroaryl moieties, as defined herein may be attached via an alkyl or heteroalkyl moiety and thus also include -(alkyl)aryl, -(heteroalkyl)aryl, -(heteroalkyl)heteroaryl, and -(heteroalkyl)heteroaryl moieties. Thus, as used herein, the phrases "aryl or heteroaryl moieties" and "aryl, heteroaryl, -(alkyl)aryl, -(heteroalkyl)aryl, -(heteroalkyl)heteroaryl, and -(heteroalkyl)heteroaryl" are interchangeable. Substituents include, but are not limited to, any of the previously mentioned substituents, i.e., the substituents recited for aliphatic moieties, or for other moieties as disclosed herein, resulting in the formation of a stable compound.

It will be appreciated that aryl and heteroaryl groups (including bicyclic aryl groups) can be unsubstituted or substituted, wherein substitution includes replacement of one or more of the hydrogen atoms thereon independently with any one or more of the following moieties including, but not limited to: aliphatic; alicyclic; heteroaliphatic; heterocyclic; aromatic; heteroaromatic; aryl; heteroaryl; alkylaryl; heteroalkylaryl; alkylheteroaryl; heteroalkylheteroaryl; alkoxy; aryloxy; heteroalkoxy; heteroaryloxy; alkylthio; arylthio; heteroalkylthio; heteroarylthio; F; Cl; Br; I; —OH; —NO$_2$; —CN; —CF$_3$; —CH$_2$F; —CHF; —CH$_2$CF$_3$; —CHCl$_2$; —CH$_2$OH; —CH$_2$CH$_2$OH; —CH$_2$NH$_2$; —CH$_2$SO$_2$CH$_3$; —C(O)R$_x$; —CO$_2$(R$_x$); —CON(R$_x$)$_2$; —OC(O)R$_x$; —OCO$_2$R$_x$; —OCON(R$_x$)$_2$; —N(R$_x$)$_2$; —S(O)R$_x$; —S(O)$_2$R$_x$; —NR$_x$(CO)R$_x$ wherein each occurrence of R$_x$ independently includes, but is not limited to, aliphatic, alicyclic, heteroaliphatic, heterocyclic, aromatic, heteroaromatic, aryl, heteroaryl, alkylaryl, alkylheteroaryl, heteroalkylaryl or heteroalkylheteroaryl, wherein any of the aliphatic, alicyclic, heteroaliphatic, heterocyclic, alkylaryl, or alkylheteroaryl substituents described above and herein may be substituted or unsubstituted, branched or unbranched, saturated or unsaturated, and wherein any of the aromatic, heteroaromatic, aryl, heteroaryl, -(alkyl)aryl or -(alkyl)heteroaryl substituents described above and herein may be substituted or unsubstituted. Additionally, it will be appreciated, that any two adjacent groups taken together may represent a 4, 5, 6, or 7-membered substituted or unsubstituted alicyclic or heterocyclic moiety. Additional examples of generally applicable substituents are illustrated by the specific embodiments described herein.

The terms "halo" and "halogen" as used herein refer to an atom selected from the group consisting of fluorine, chlorine, bromine, and iodine.

It will be appreciated that the above groups and/or compounds, as described herein, may be optionally substituted with any number of substituents or functional moieties. That is, any of the above groups may be optionally substituted. As used herein, the term "substituted" is contemplated to include all permissible substituents of organic compounds, "permissible" being in the context of the chemical rules of valence known to those of ordinary skill in the art. In general, the term "substituted" whether preceded by the term "optionally" or not, and substituents contained in formulas of this invention, refer to the replacement of hydrogen radicals in a given structure with the radical of a specified substituent. When more than one position in any given structure may be substituted with more than one substituent selected from a specified group, the substituent may be either the same or different at every position. It will be understood that "substituted" also includes that the substitution results in a stable compound, e.g., which does not spontaneously undergo transformation such as by rearrangement, cyclization, elimination, etc. In some cases, "substituted" may generally refer to replacement of a hydrogen with a substituent as described herein. However, "substituted," as used herein, does not encompass replacement and/or alteration of a key functional group by which a molecule is identified, e.g., such that the "substituted" functional group becomes, through substitution, a different functional group. For example, a "substituted phenyl group" must still comprise the phenyl moiety and cannot be modified by substitution, in this definition, to become, e.g., a pyridine ring. In a broad aspect, the permissible substituents include acyclic and cyclic, branched and unbranched, carbocyclic and heterocyclic, aromatic and nonaromatic substituents of organic compounds. Illustrative substituents include, for example, those described herein. The permissible substituents can be one or more and the same or different for appropriate organic compounds. For purposes of this invention, the heteroatoms such as nitrogen may have hydrogen substituents and/or any permissible substituents of organic compounds described herein which satisfy the valencies of the heteroatoms. Furthermore, this invention is not intended to be limited in any manner by the permissible substituents of organic compounds. The term "stable," as used herein, preferably refers to compounds which possess stability sufficient to allow manufacture and which maintain the integrity of the compound for a sufficient period of time to be detected and preferably for a sufficient period of time to be useful for the purposes detailed herein.

Examples of substituents include, but are not limited to, halogen, azide, alkyl, aralkyl, alkenyl, alkynyl, cycloalkyl, hydroxyl, alkoxyl, amino, nitro, sulfhydryl, imino, amido, phosphonate, phosphinate, carbonyl, carboxyl, silyl, ether, alkylthio, sulfonyl, sulfonamido, ketone, aldehyde, ester, heterocyclyl, aromatic or heteroaromatic moieties, $—CF_3$, —CN, aryl, aryloxy, perhaloalkoxy, aralkoxy, heteroaryl, heteroaryloxy, heteroarylalkyl, heteroaralkoxy, azido, amino, halide, alkylthio, oxo, arylalkyl, carboxy esters, -carboxamido, acyloxy, aminoalkyl, alkylaminoaryl, alkylaryl, alkylaminoalkyl, alkoxyaryl, arylamino, aralkylamino, alkylsulfonyl, -carboxamidoalkylaryl, -carboxamidoaryl, hydroxyalkyl, haloalkyl, alkylaminoalkylcarboxy-, aminocarboxamidoalkyl-, cyano, alkoxyalkyl, perhaloalkyl, arylalkyloxyalkyl, and the like.

The following examples are intended to illustrate certain embodiments of the present invention, but do not exemplify the full scope of the invention.

Example 1

This example describes the preparation and use of porous metal-organic frameworks (MOFs), comprising organic compounds coordinated to metal ions, with tunable polarity as ammonia adsorbents for adsorption heat pumping and heat storage, as well as in gas cleanup and air purification applications. In the described method, porous MOFs with open metal sites can be generated by solvothermal reactions between an N-heterocyclic aromatic ligand and divalent metal ions. The resulting materials may have high ammonia uptakes and can be stable to repeated cycling. Synthesis of isostructural materials with various metals may result in modification of the enthalpy of adsorption for ammonia, enabling tuning of ammonia binding strength. Sorbents with strong affinities and high uptakes for ammonia that are stable to repeated cycling may be desirable for ammonia removal from air and gas purification applications. High ammonia uptake as well as the ability to tune ammonia binding strength is potentially desirable for thermal battery and adsorption heat pump applications.

Figure 3:
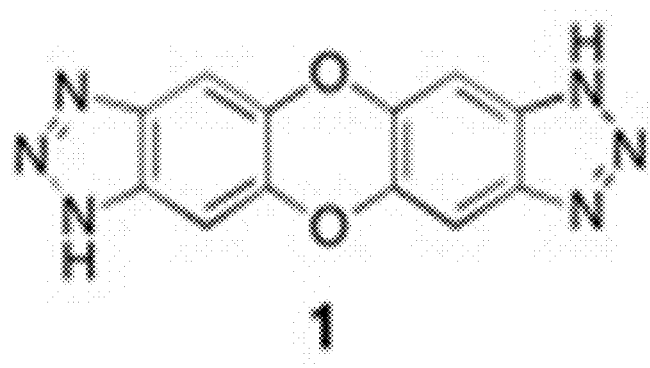
FIG. 3 shows, in accordance with some embodiments, the chemical structure of the BTDD linker.

The bibenzotriazoledibenzodioxin linker (BTDD, Compound 1, FIG. 3), synthesized according to a literature procedure, is first suspended in N,N-dimethylformamide (DMF) and sonicated until a homogeneous suspension is obtained. The resulting suspension is then heated with stirring to 130° C. until a clear solution is obtained. Upon cooling to room temperature, the BTDD solution is mixed with an equal volume of a solution comprising divalent metal chloride hydrate (2 eq.) in an alcohol containing a small amount of hydrochloric acid (HCl). The resulting clear solutions are then heated in a capped jar to 65° C. for 2-3 weeks. The resulting crystalline solids are then collected by filtration, washed with dimethylformamide (DMF), and subjected to a Soxhlet extraction with methanol (MeOH). Finally, the compounds are heated under vacuum ($10^{-4}$-$10^{-5}$ torr) to 100° C. for 24 hours.

Figure 4:
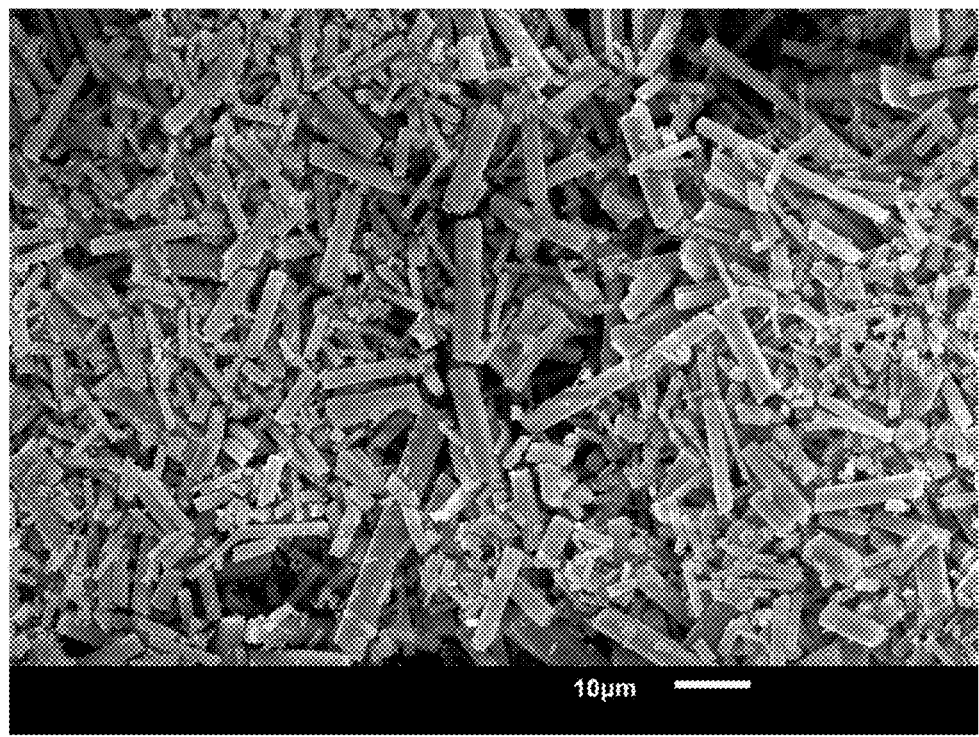
FIG. 4 shows an exemplary scanning electron microscopy (SEM) image of a MOF illustrating the hexagonal rod morphology of the crystallites.

The obtained solids with formula $M_2Cl_2$(BTDD) can be highly crystalline. Isostructural materials have been formed with divalent salts of Mn, Co, Ni, and Cu, producing MOFs 2, 3, 4, and 5 respectively. Single crystallites of 2, 3, 4, and 5 share similar morphology of long hexagonal rods, as observed by optical or electron microscopy (FIG. 4).

Figure 5:
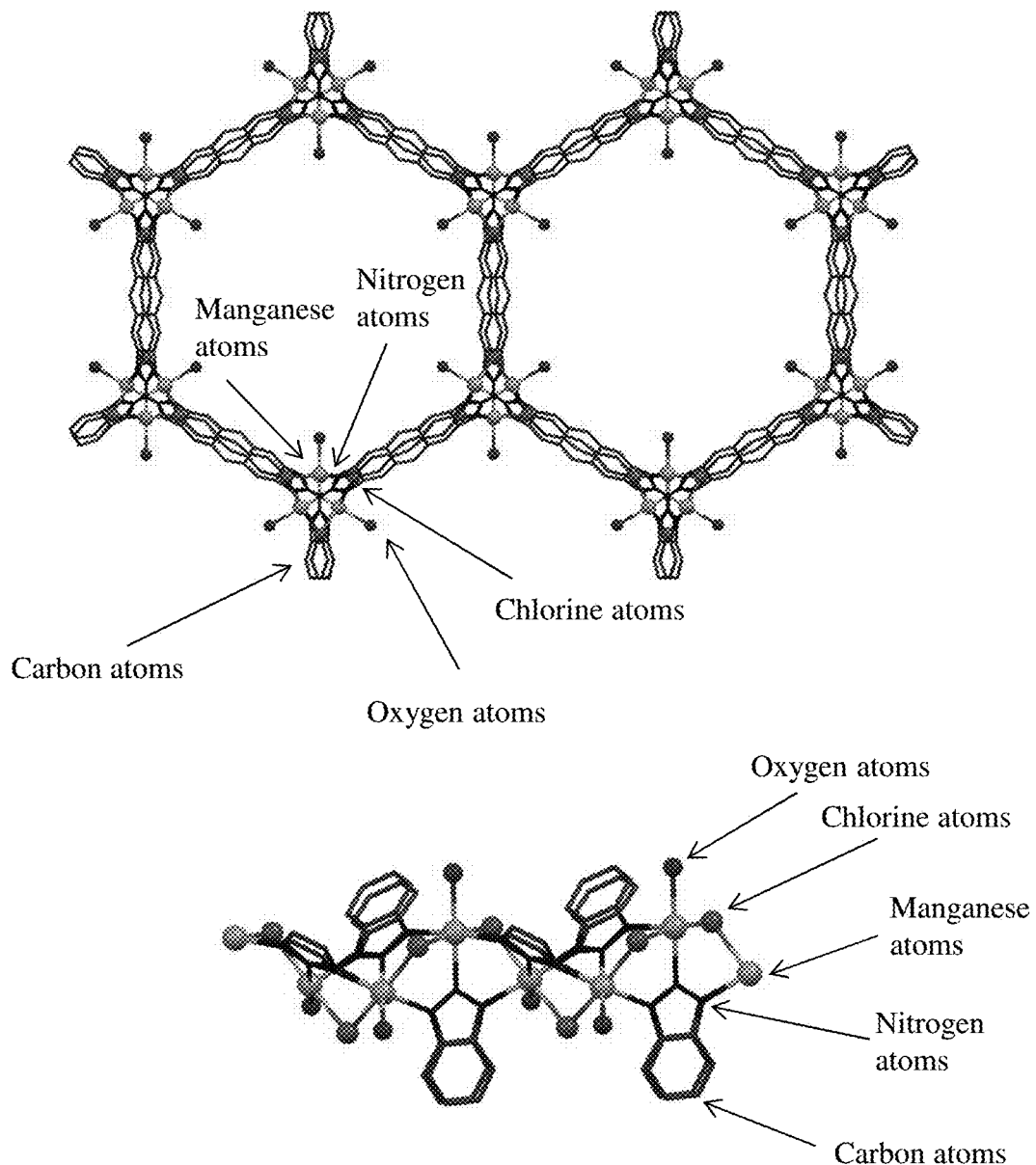
FIG. 5 shows, according to certain embodiments, a SC-XRD structure of an as synthesized MOF.

The structure of the as-synthesized compound 2 was determined by single-crystal x-ray diffraction (SC-XRD). It exhibits a honeycomb-like grid in the R3-m space group consisting of infinite metal-chloride chains coiled into three-fold helices, interconnected by the bistriazolate linkers (FIG. 5). Hexagonal pore channels ~23 A in diameter run parallel to the metal-chloride helices. The BTDD linker molecules were refined as disordered over 2 positions, being puckered inwards or outwards relative to the average flat geometry.

Each Mn(II) ion resides in an octahedral coordination environment formed by 3 nitrogen atoms from 3 separate triazolate groups, 2 bridging chlorides, and a neutral water molecule (FIG. 5).

Figure 6:
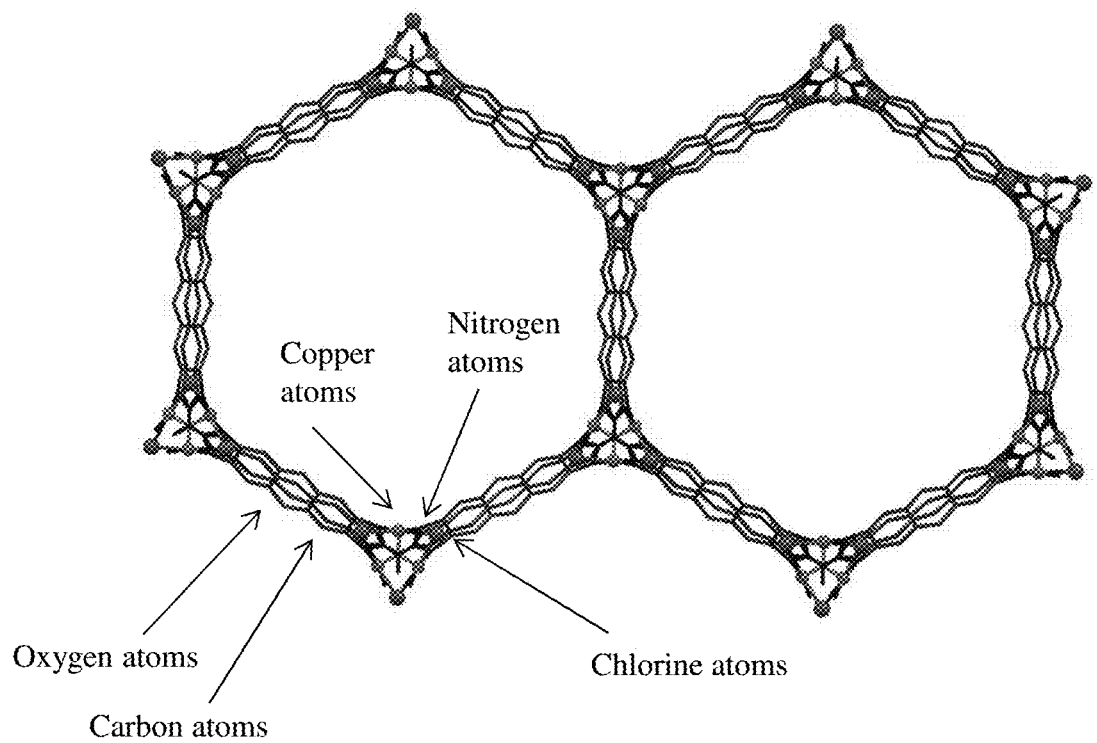
FIG. 6 shows a SC-XRD structure of an activated sample of a MOF, according to certain embodiments.

The SC-XRD structure of the activated framework was also obtained by mounting a MeOH-soaked single crystal of 5 in oil on a SC-diffractometer, then heating to 100° C. prior to data collection. The determined structure closely resembles that of 2, except that the solvent molecules are missing. The coordination environment around the metal is therefore square-pyramidal, with a vacant coordination site pointing towards the pore channel (FIG. 6).

The SC-XRD structure of the activated framework was also obtained by mounting a MeOH-soaked single crystal of 5 in oil on a SC-diffractometer, then heating to 100° C. prior to data collection. The determined structure closely resembles that of 2, except that the solvent molecules are missing. The coordination environment around the metal is therefore square-pyramidal, with a vacant coordination site pointing towards the pore channel (FIG. 6).

Figure 7:
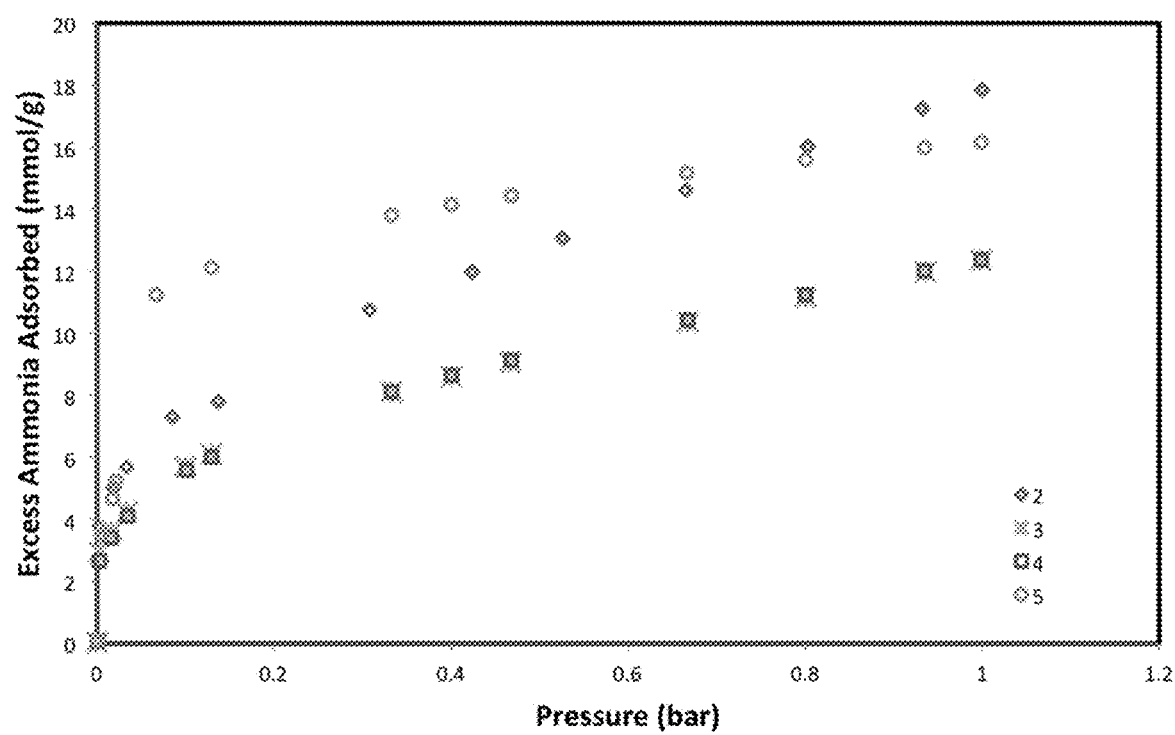
FIG. 7 shows a plot of the initial ammonia isotherms for various non-limiting MOFs, according to certain embodiments.
Figure 8:
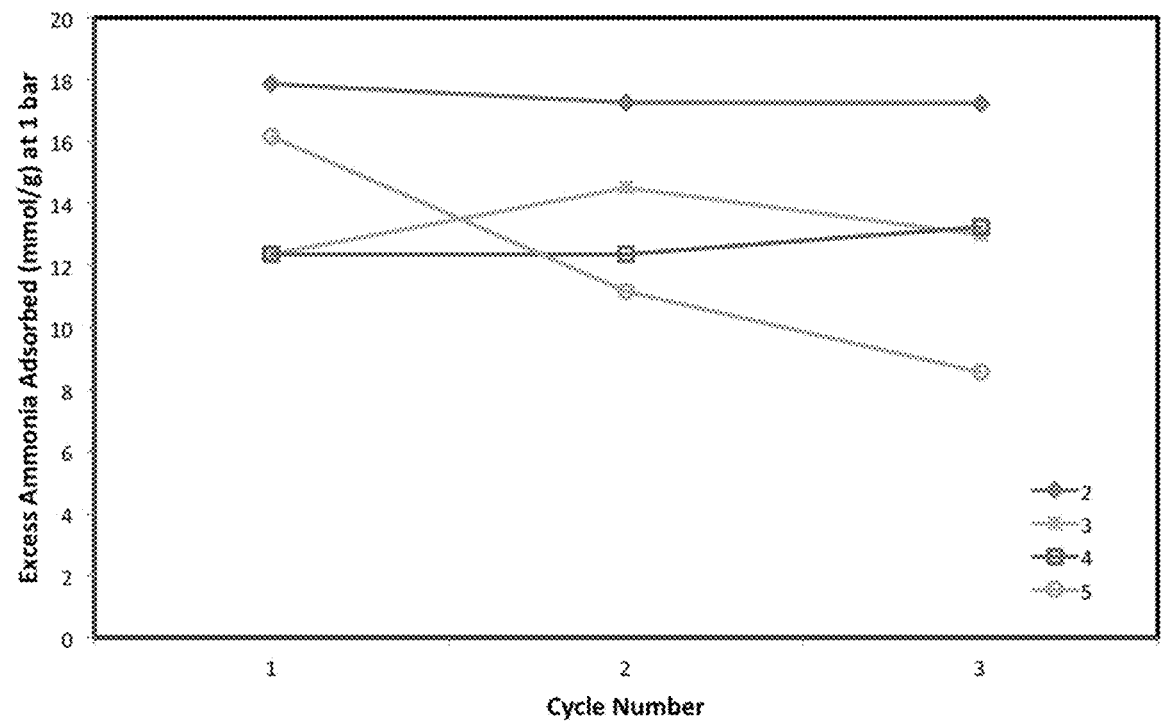
FIG. 8 shows ammonia uptake at 1 bar over 3 cycles for various non-limiting MOFs, according to one set of embodiments.

Ammonia adsorption isotherms for activated samples of 2, 3, 4, and 5 were measured volumetrically at 293 K (FIG. 7). The materials all exhibit Type I isotherms, showing sharp uptakes at low ammonia pressure. After each isotherm, the adsorbents were reactivated at 100° C. with high vacuum before the next cycle. After 3 cycles of ammonia for each material, a nitrogen isotherm was measured to check if porosity is maintained after exposure to ammonia. Crystallinity of the ammonia-exposed materials was then tested with powder x-ray diffraction (PXRD). FIG. 8 shows the ammonia adsorption at 1 bar for 3 cycles of ammonia isotherms for the isostructural series 2, 3, 4, and 5.

Compound 2 may exhibit a high capacity for ammonia adsorption, adsorbing 17.8 mmol $NH_3$ per gram of adsorbent at 1 bar of ammonia. The capacity is stable to repeated cycling, showing only a 3.5% decline after 3 cycles. The material maintains its crystallinity and porosity after exposure to ammonia gas. Compounds 3 and 4 perform similarly to each other, adsorbing 12.4 mmol $NH_3$ per gram of adsorbent at 1 bar of ammonia. The capacity is stable to repeated cycling. Both of these materials maintain their crystallinity and porosity after exposure to ammonia gas. Compound 5 may have a high initial uptake of ammonia, at 16.16 mmol per gram, and may show an affinity for ammonia at low pressure, but loses crystallinity and porosity after the first exposure to ammonia gas. Ammonia uptake decreases by 49% after 3 cycles.

Example 2

This example describes a method for measuring ammonia adsorption isotherms for the compounds described in Example 1. Ammonia adsorption isotherms were measured by a volumetric method using a Micromeritics ASAP 2020 gas sorption analyzer. A typical sample of ca. 40 mg of metal-organic framework, pre-activated at 100° C. to remove all residual solvent, was transferred in an Ar filled glovebox to a pre-weighed analysis tube. The tube with sample inside was weighed again to determine the mass of the sample. The tube was capped with a Micromeritics TranSeal, brought out of the glovebox, and transferred to the analysis port of the gas sorption analyzer. Free space correction measurements were performed using ultra-high purity He gas (UHP grade 5, 99.999% pure). Ammonia isotherms were measured using UHP grade ammonia. Ammonia analyses were performed using water baths held at constant temperature with a recirculating chiller. Oil-free vacuum pumps were used to prevent contamination of sample or feed gases.

Example 3

Figure 9A:
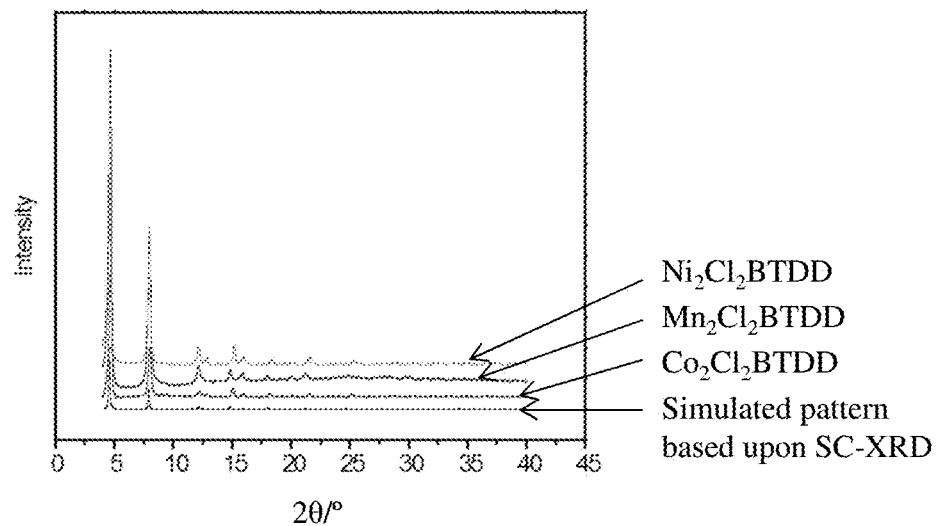
FIG. 9A shows, according to some embodiments, powder X-ray diffraction patterns for various non-limiting MOFs prior to ammonia adsorption.
Figure 9B:
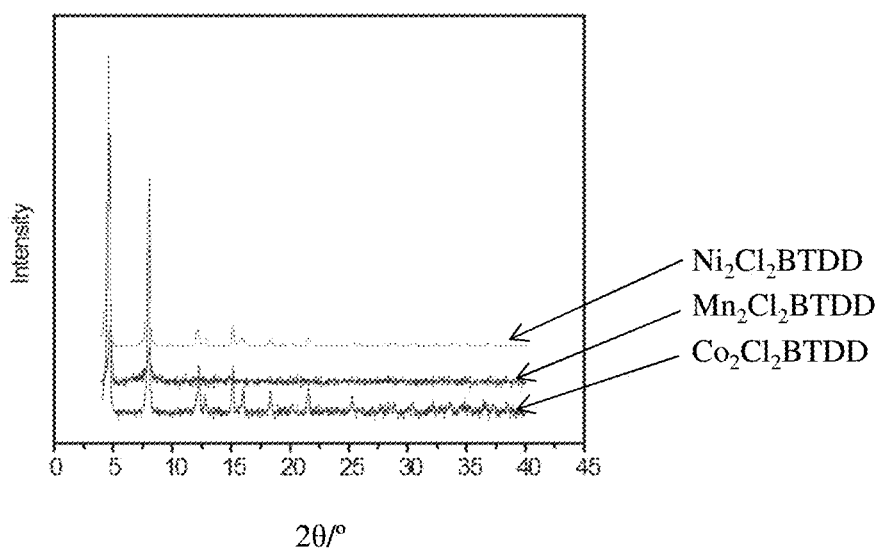
FIG. 9B shows, in accordance with certain embodiments, powder X-ray diffraction patterns for various non-limiting MOFs after ammonia adsorption.

This example describes a method for determining the crystallinity of the compounds described in Example 1. Powder x-ray data were used as a 'fingerprint' method for determining whether the samples are crystalline. The PXRD pattern for the crystalline structure as determined by single-crystal x-ray diffraction was simulated and compared to the PXRD pattern of the powder materials to determine whether or not they had the same lattice. Retention of crystallinity before and after ammonia exposure was evaluated by checking to see if peak positions are the same in the PXRD patterns. Intensities and signal-to-noise differed slightly depending on amount of sample used. FIG. 9A shows PXRD patterns of the MOFs described in Example 1 before ammonia adsorption and FIG. 9B shows PXRD patterns of the MOFs described in Example 1 after ammonia adsorption.

Example 4

This example describes a method for adsorbing water employing MOFs based on the bis(1H-1,2,3-triazolo[4,5-b], [4',5'-i])dibenzo[1,4]dioxin (BTDD) linker. These materials feature large mesoporous channels with diameter 2.2 Å, hydrophilic open metal sites, and stability towards polar analytes engendered by strong metal-azolate linkages.

Figure 10:
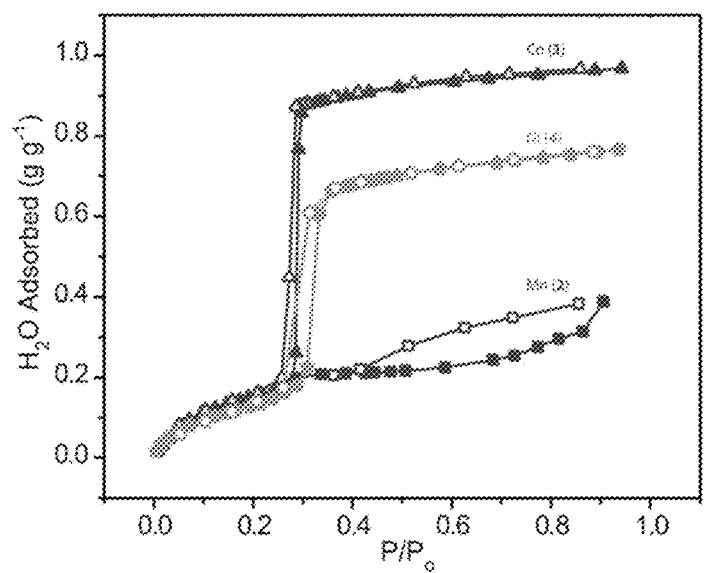
FIG. 10 shows water vapor adsorption (closed symbols) and desorption (open symbols) for non-limiting MOF, accordingly to some embodiments.

Water vapor adsorption isotherms were measured at 298 K for MOFs 2-2, 2-3, and 2-4 (see FIG. 10) with compositions as described in Example 1. In FIG. 10: FIG. 2: Water vapor adsorption (closed symbols) and desorption (open symbols) at 298 K for activated samples of 2-1 (squares), 2-2 (triangles), and 2-3 (pentagons).

All materials show type IV isotherms featuring a step in the uptake at approximately 0.28 $P/P_0$, which is attributed to the onset of pore filling. Before this step, the water may be adsorbed via cluster adsorption around the open metal sites. For 2-2, the onset of pore filling may be concurrent with pore collapse and structural rearrangement; this MOF showed a lower total uptake of 0.389 g/g than MOFs 2-3 and 2-4. This value does not correspond to a fully pore-filled material, as the total pore volume measured by nitrogen adsorption at 77 K is 1.168 $cm^3/g$. Additionally, after water adsorption the material exhibits a mostly amorphous powder X-ray diffraction (PXRD) pattern and the total surface area is greatly reduced. In contrast, 2-3 and 2-4 exhibit large and steep uptake steps as their pores are filled. These materials remain crystalline after water adsorption and they retain their high surface areas of 1912 $m^2/g$ and 1762 $m^2/g$, respectively. At 94% RH, the total uptake for compound 2-4 is 0.766 g/g and for compound 2-3 it is 0.968 g/g.

For 2-3, hysteresis between adsorption and desorption is low, which may be indicative of continuous reversible pore filling. The heat of adsorption for water in 2-3 is approximately 55 kJ/mol at zero coverage, falling to 45.8 kJ/mol during the pore filling step. The second value is close to the heat of vaporization for water of 40.7 kJ/mol, suggesting that water-water interactions are important forces during pore filling. This value is similar to the enthalpy of adsorption reported for other mesoporous MOFs.

Figure 11:
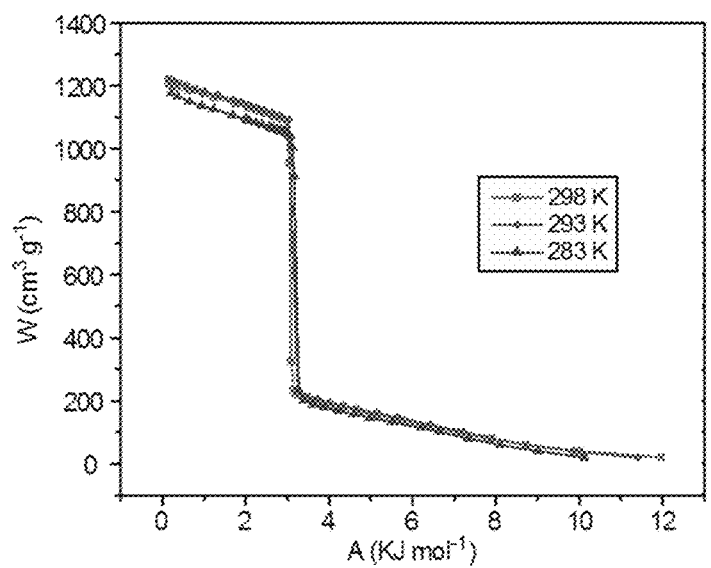
FIG. 11 shows heat energy taken up by the evaporator per cycle as a function of the temperature lift for a non-limiting MOF, according to some embodiments.

A characteristic curve, which converts the independent pressure and temperature variables governing the uptake into a single parameter related to the Gibbs free energy of adsorption, was generated for 2-3. The characteristic curve may allow the extrapolation pf an isotherm at one temperature to a different temperature and pressure, such as a temperature and pressure that may be used in a device. Water vapor isotherms at 283 K, 293 K, and 298 K were obtained for 2-3 and used to calculate a characteristic curve for 2-3 (FIG. 11). The characteristic curve was used to generate adsorption and desorption isotherms at temperatures relevant for adsorption heat pump (AHG) and atmospheric water generator (AWG) applications.

In FIG. 11: Heat energy taken up by the evaporator per cycle as a function of the temperature lift for 2-2 in volumetric (left axis) and gravimetric (right axis) units. To determine temperature lift, evaporator temperature was varied while the condenser temperature was held constant at 303 K and the desorption temperature was held constant at 373 K.

The performance of 2-3 in AWG to generate potable water in desert regions was evaluated by simulating the average conditions in Tabuk, Saudi Arabia. In Tabuk, the average day time temperature and RH are 40° C. and 5%, changing at night to 25° C. and 35%. Under these conditions, 2-3 would capture at night and release during the day 82% of its weight in water.

Compound 2-3 can also be used to transfer heat. For AHP applications, the water-2-3 working pair can achieve a 20° C. temperature lift with a cooling capacity per cycle of approximately 400 kWh/m$^3$. For the use of low-grade heat sources, compound 2-3 can be regenerated using waste heat of only 55° C. Additionally, using a regeneration temperature of 55° C., 2-3 has a Coefficient of Performance (COP) of 0.885. COP is a measure of efficiency and is the ratio of useful cold energy output divided by input heat energy. For AHP cooling applications, COP varies from 0 to 1. The high COP for this material may be a result of the high gravimetric capacity, which may result in reduced dead thermal mass.

Compound 2-3 is also very stable to cycling; after 30 cycles between 25° C. and 120° C. with water vapor pressure held constant at 13 mmHg, the capacity of 2-3 declines only 6.3%. PXRD before and after cycling indicates no loss in crystallinity. The initial gravimetric capacity is greater than 1 g/g. At lower temperatures, water may be able to access greater than one coordination site per metal. Activation at higher temperatures may remove all the water and allow the geometry around each metal to solidify in the 5-coordinate square pyramidal arrangement as observed in the crystal structure.

For an external temperature of 32° C., the air conditioner output of 2-3 could be 12° C. using a regeneration temperature of only 55° C. For AWG applications, in areas with temperature swings between night and day on either side of the step in adsorption, 2-3 may capture and release 82 wt % water. Compound 2-3 may be capable of pre-adsorbing water on metal open sites, which may reduce the effective pore volume and may allow water uptake to proceed by reversible continuous pore filling.

MnCl$_2$*4H$_2$O (98%, Strem Chemicals), CoCl$_2$*6H$_2$O (99.9%, Alfa Aesar), NiCl$_2$*6H$_2$O (Strem Chemicals), HCl (32-35%, BDH-VWR Analytic) methanol (99.9%, VWR), N,N-dimethylformamide (99.8%, Millipore), ethanol (ACS grade, Mallinckrodt) were used as received Powder X-ray diffraction (PXRD) patterns were recorded with a Bruker Advance II diffractometer equipped with a θ/2θ Bragg-Brentano geometry and Ni-filtered CuKα radiation (Kα$_1$=1.5406 Å, Kα$_2$=1.5444 Å, Kα$_1$/Kα$_e$=0.5). The tube voltage and current were 40 kV and 40 mA, respectively. Samples for PXRD were prepared by placing a thin layer of the appropriate material on a zero-background silicon crystal plate.

Nitrogen adsorption isotherms were measured by a volumetric method using a Micromeritics ASAP 2020 gas sorption analyzer. A typical sample of ca. 40 mg of metal-organic framework, pre-activated at 100° C. to remove residual solvent, was transferred in an Ar filled glovebox to a pre-weighed analysis tube. The tube with sample inside was weighed again to determine the mass of the sample. The tube was capped with a Micromeritics TranSeal, brought out of the glovebox, and transferred to the analysis port of the gas sorption analyzer. Free space correction measurements were performed using ultra-high purity He gas (UHP grade 5, 99.999% pure). Nitrogen isotherms were measured using UHP grade nitrogen. All nitrogen analyses were performed using a liquid nitrogen bath at 77 K. Oil-free vacuum pumps were used to prevent contamination of sample or feed gases.

Water vapor adsorption isotherms were measured by a volumetric method using a Micromeritics ASAP 2020 gas sorption analyzer with a vapor dose option and a heated manifold. A typical sample of ca. 40 mg of metal-organic framework, pre-activated at 100° C. to remove all residual solvent, was transferred in an Ar filled glovebox to a pre-weighed analysis tube. The tube with sample inside was weighed again to determine the mass of the sample. The tube was capped with a Micromeritics TranSeal, brought out of the glovebox, and transferred to the analysis port of the gas sorption analyzer. Free space correction measurements were performed using ultra-high purity He gas (UHP grade 5, 99.999% pure). Water vapor adsorption isotherms were measured using Milli-Q water. The water was degassed on the ASAP 2020 manifold prior to measurement. All water analyses were performed using water baths held at constant temperature with a recirculating chiller. The manifold was held 10° C. above the temperature of the sample water bath, and the vapor dosing tube was held 15° C. above the temperature of the sample water bath. Oil-free vacuum pumps were used to prevent contamination of sample or feed gases.

Water vapor adsorption cycling experiments were performed using a Surface Measurement Systems DVS Adventure dynamic gravimetric water sorption analyzer. A typical sample of ca. 5 mg of metal organic framework, pre-activated at 100° C., but later exposed to air, was loaded into the microbalance. The instrument was set to deliver a constant vapor pressure of 13 mmHg. The baseline mass of the sample was measured over 2 hours at the desorption temperature. The sample was then cycled between the adsorption temperature, normally 25° C., and the desorption temperature 30 times. The sample's mass was measured once per minute. Heating and cooling ramp rates were 1° C. per minute. The instrument switched to the next cycle when the change in mass per minute was less than 0.02%.

The characteristic curve was constructed based upon the adsorption potential (A), which is the Gibbs free energy of adsorption with inverse sign:

$$A = RT\ln\left(\frac{p_o(T)}{p}\right), \quad \text{(Equation 1)}$$

where $p_o$ is the saturation vapor pressure of the working fluid at the temperature of analysis, p is the pressure at each loading value, R is the ideal gas constant, and T is the analysis temperature.

Isotherms measured at different temperatures may collapse onto a single characteristic curve. Water isotherms for 2-3 were measured at 283 K, 293 K, and 298 K, and were found to collapse onto a characteristic curve.

Figure 12:
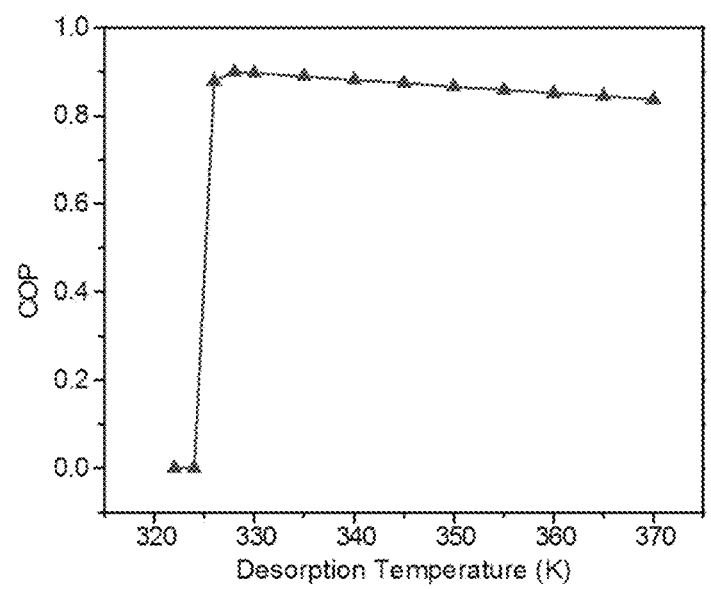
FIG. 12 shows the COP for cooling applications with a 20° C. temperature lift for water for a non-limiting MOF at various desorption temperatures, according to some embodiments.

The COP for cooling with a 20° C. temperature lift is defined as:

$$\frac{Q_{ev}}{Q_{regen}}, \quad \text{(Equation 2)}$$

where $Q_{ev}$ is the heat energy removed from an evaporator through evaporation of a working fluid and $Q_{regen}$ is the heat energy required to regenerate the adsorbent. The COP for cooling may vary between 0 and 1. The enthalpy of adsorption of water in 3 was assumed to be 45.8 kJ/mol throughout the working range. The heat capacity of the sorbent was assumed constant at 1 J/g*K. The relevant temperatures for the calculation are $T_{cond}$=303 K, $T_{ev}$=283 K. The desorption temperature was allowed to vary. The COP for cooling applications with a 20° C. temperature lift for water in 2-3 at various desorption temperature is shown in FIG. 12.

Example 5

The following non-limiting examples relates to the adsorption of bromine. Molecular bromine is one of the most industrially important raw chemicals, being extensively used for the preparation of flame retardants, agricultural products, and pharmaceuticals. Unfortunately, its extreme toxicity and high corrosiveness poses a serious challenge for safe handling, storage and transportation. Despite decades of experience in mitigating these challenges, tragic accidents still occur worldwide due to leaks or explosions, making the development of recyclable materials that can enable safe handling, and on-demand delivery of bromine highly desirable.

The example describes a safe storage of molecular bromine by means of a porous azolate MOF with open Co(II) sites. Upon exposure to bromine vapors, cobalt centers in this MOF undergo oxidation to the Co(III) state and bromine molecules become chemically trapped as metal-coordinated bromide ions. The porosity of this material maximizes the accessibility of reactive sites to the incoming bromine molecules. Subsequent removal of excess bromine vapors yields a stable non-volatile solid with a total bromine content of 26% (w/w). This compound does not further release bromine at ambient temperatures and can be safely stored, handled, and transported. About 80% of the total bromine content (ca. 20% of the total weight) can then be liberated upon demand as molecular bromine by heating the solid.

A solvothermal reaction between bis-triazolodibenzodioxin ($H_2$—BTDD, 5-1) and $CoCl_2*(H_2O)_6$, produces $Co_2Cl_2$(BTDD) framework (5-2).

The structure of compound 5-2, as determined by neutron powder diffraction at 10K is analogous to the corresponding Mn(II)-based framework in its solvent-free form. Similarly to the other isostructural MOFs of this series, metal centers are five-coordinate with the sixth coordination site, which faces towards the pore channels, remaining vacant.

A brief exposure of the activated compound 5-2 to bromine vapors results in an immediate color change from olive-green to dark brown, indicative of Co(II) to Co(III) oxidation. Prolonged exposure to gaseous bromine (ca. 48 h) results in the conversion of 5-2 to its brominated form, $Co_2Cl_2Br_2$(BTDD) (5-3). The formula of 5-3 (as obtained after removal of excess bromine by heating to 70° C. under vacuum) was confirmed by elemental analysis (C, H, N) and ICP-MS (Br:Co ratio).

Notably, the crystallinity of 5-2 is maintained during this transformation, as established by X-ray powder diffraction. A closer comparison of the PXRD patterns of compounds 5-2 and 5-3 reveals a slight, but noticeable, shift to higher 2θ values that increases linearly with the angle. Such an angle-dependent shift indicates that upon oxidation the unit cell of 5-2 shrinks, most likely due to the difference in ionic radius of high spin Co(II) versus low spin Co(III).

The porosity is also nearly unaffected by the oxidation. $N_2$ adsorption measurements show a total saturation uptake of 429 cm$^3$/g (262874 cm$^3$/mol) at 77K for 5-3, which is about 80% of the corresponding molar value of 5-2. This finding is not unexpected, when taking into account the effective reduction of the pore diameter due the added bromide ions protruding into the channels. Applying the Barrett-Joyner-Halenda (BJH) pore size distribution analysis with Kruk Jaroniec Sayari correction for hexagonal pores provides a quantitative estimate for this pore narrowing, as the peak of the pore diameter distribution shifts from 22.9 to 20.3 Å.

The high crystallinity of compounds 5-2 and 5-3 allowed determination of their crystal structure by neutron powder diffraction at 10K. Both compounds exhibit similar honeycomb-like structure as previously reported for $Mn_2Cl_2$(BTDD), comprised from infinite —Co—Cl— chains coiled into threefold spirals and interconnected by the bistriazolate linkers. The bromide ions in compound 5-3 occupy the free coordination sites at a distance of 2.45(4) Å from the Co(III) center. Although partial occupancy of these positions was considered, the best fit between the calculated and measured diffraction patterns was obtained with fully occupied Br sites. In addition, allowing the possibility of full or partial interchange of the two halides between the terminal and bridging positions did not improve the fit any further, but, in fact, made it worse. This suggests that once reacted with the open metal sites the bromine atoms remain fixed (as bromides) at the terminal positions and do not undergo incorporation within the infinite —Co—Cl— chains.

Thermogravimetric analysis (TGA) of compound 5-3 showed a clear weight drop of ca. 21% at approximately 200° C. whereas the weight of 5-2 remained nearly constant until significantly higher temperatures. Conjunction with mass spectrometry (TGA-MS) demonstrates that this weight drop was accompanied by evolution of ions with masses associated with all three isotopologs of molecular bromine, namely, [$^{79}$Br-$^{79}$Br]$^+$, [$^{79}$Br-$^{81}$Br]$^+$, and [$^{81}$Br-$^{81}$Br]$^+$, as well as their decomposition products—ionized $^{79}$Br and $^{81}$Br atoms and the corresponding hydrogen bromide molecules (see FIG. 13).

Figure 13:
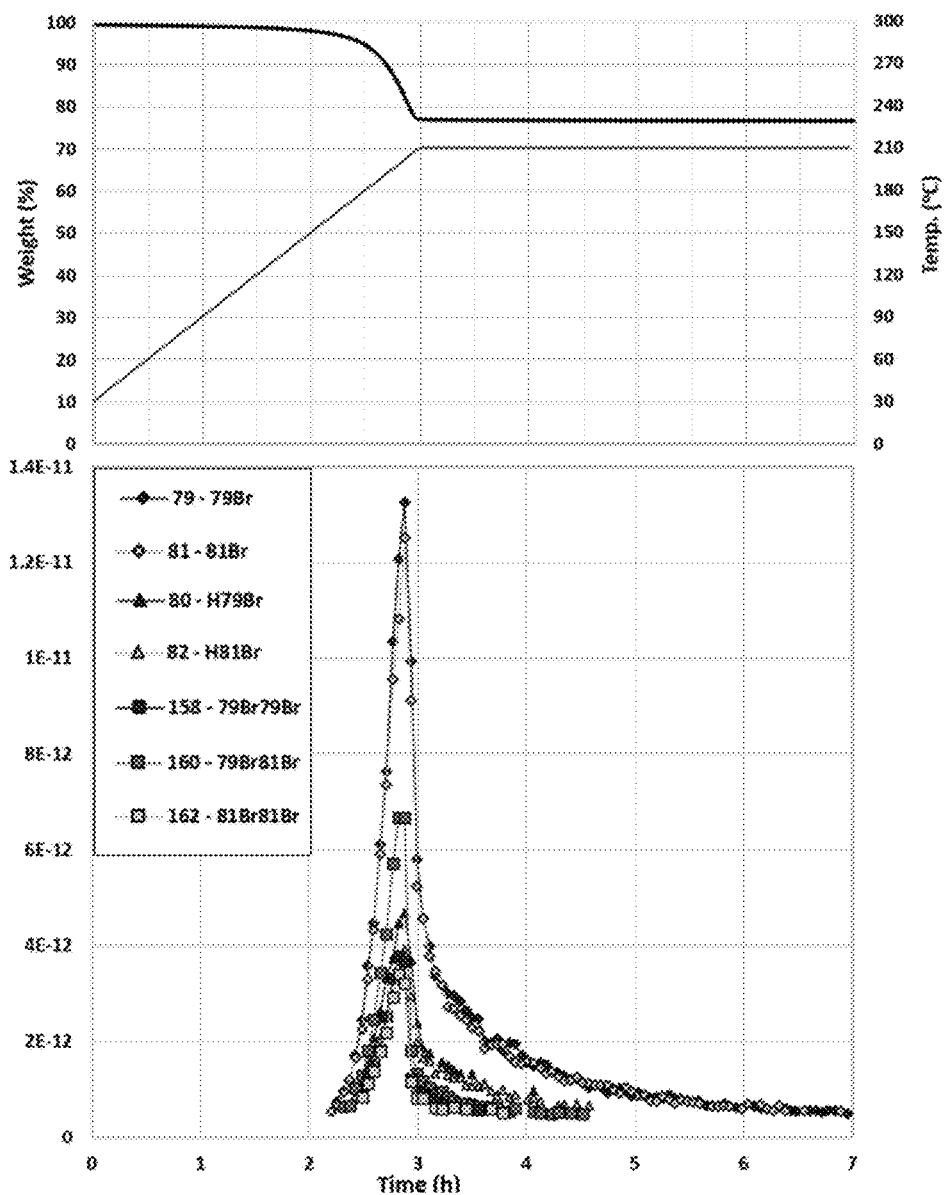
FIG. 13 shows thermogravimetric analysis in conjunction with mass spectroscopy (TGA-MS) of a non-limiting MOF as a function of time, accordingly to some embodiments.

In FIG. 13: Thermogravimetric analysis in conjunction with mass spectroscopy (TGA-MS) of 5-3 as a function of time (weight %—black line, temperature profile—grey line).

The thermal evolution of bromine was also performed in a quantitative manner on a 50-100 mg scale, by heating samples of 5-3 under a static vacuum and collecting the evolved bromine in a liquid nitrogen cooled trap. The amount of trapped bromine was then determined by an iodometric titration. In general, the mass of the evolved bromine, as calculated from iodometry (assuming that no other oxidizing species were present) was about 20%, in consistency with the weight loss observed by TGA for the same batch (Table 1). Importantly, the mass loss as calculated from the titration never exceeded that found by TGA (Table 1, columns 4 and 5), supporting this working assumption. Indeed, if lighter oxidizing species such as $Cl_2$ or ClBr were evolved in addition to $Br_2$, the weight loss calculation using molecular weight of $Br_2$ would yield a value exceeding the one observed by TGA. Moreover, a similar weight loss (Table 1, column 6) could be calculated from the corresponding Br to Co ratios before and after the thermal treatment, as determined by ICP-MS (Table 2, column 2).

Similarly to the oxidation reaction, this thermally-induced reduction proceeds with no apparent deterioration of crystallinity or porosity. The thermally treated sample (5-4) exhibits a PXRD pattern and molar $N_2$ sorption isotherm (assuming the approximate formula of $Co_2Cl_2Br_{0.4}$(BTDD) for 5-4) which are nearly identical to those of 5-2. Furthermore, the BJH pore size analysis showed that the pore diameter distribution, while still remaining quite narrow, shifts back to 22.6 Å, very close to the original value of 22.9 Å. In addition, no evidence of linker bromination was found in the $^1H$ and $^{13}C$ NMR spectra of the acid-digested sample of 5-4.

Compound 5-4 can then undergo at least one additional cycle of bromine loading and elimination, without change in its storage capacity (19.1 weight % by iodometry).

mmol/g for Cu 6-6. When normalized to open metal site density, however, both MOFs of the ligand linkers BBTA and BTDD show similar ammonia uptake for each respective metal; 17.95 mmol/g for 6-1 compared to 15.67 mmol/g for 6-4, 14.68 mmol/g for 6-2 compared to 15.64 mmol/g for 6-5, and 19.79 mmol/g for 6-3 compared to 20.43 mmol/g for 6-6.

Changing the conditions of RH can also have effect on the amount of gas adsorption when comparing various pore sizes. Ammonia breakthrough testing experiments with a flow rate of 140 sccm and 1000 ppm ammonia showed that under dry conditions, 6-1 with had a 12.7 wt % capacity of ammonia (1.48 molecules $NH_3$ per open Co site) and 6-4 had a 7.5 wt % capacity of ammonia (1.08 molecules per open Co site). With 80% RH, the wt % capacity of ammonia was 6.9 and 5.4 for 6-1 and 6-4, respectively.

Water adsorption isotherms were also evaluated for 6-1 and 6-4 with varying pore size. MOF 6-1 with ligand BBTA produced 0.26 g $H_2O$ per gram adsorbent 6-4, while MOF 6-4 with ligand BTDD produced 0.79 g $H_2O$ per gram adsorbent.

In these smaller pore-size, more hydrophilic materials, the water uptake step occurs at very low RH, resulting in a type

TABLE 1

| | Sample description | Br:Co ratio | Molecular weight (gr/m) | Br content (%) | Weight Loss (%) | | |
|---|---|---|---|---|---|---|---|
| | | | | | TGA | Iodometry | Calc. from Br:Co ratio difference |
| Calc. | $Co_2Cl_2Br_2$(BTDD) | 2.00:2.00 | 612.77 | 26.08 | — | — | — |
| Exp. | Before heating | 1.87:2.00 | 602.38 | 24.79 | ca. 21 | 19.4 ± 1.1 | 20.3 |
| | After heating | 0.34:2.00 | 480.13 | 5.66 | | | |

Accordingly, this example shows that the MOF is capable of trapping molecular bromine in the form of metal-coordinated bromide ions. The reverse reaction, by which the stored bromine can be liberated, occurs at elevated temperatures, enabling an easy differentiation between the storage and bromine-releasing regimes. Without wishing to be bound by theory, while most MOFs are quite unstable towards the highly corrosive $Br_2$ vapors, the triazolate-based linkers used here can form significantly stronger bonds to metal ions, enhancing the overall stability of the material. Its structural integrity is, therefore, maintained not only upon oxidation, but also upon thermally induced reduction, whereas its persistent porosity maximizes the reactive surface where binding and releasing molecular bromine takes place.

This non-limiting example describes a method for absorption of water or ammonia and the effect of changing the pore diameter of the ligand linker in a MOF. Various ligand linkers have different pore diameters. For example; 13 Angstroms for BBTA, 18 A for NBTA, 23 A for BTDD, and 31 A for DBT-XL. Generally, changing the ligand linker, no matter the pore diameter, can produce the same honeycomb-like structure in a MOF. However, changes in the amount of gas adsorption are noted with various ligand linkers.

Ammonia adsorption isotherms were measured at 298 K and 1 bar for MOFs with the BBTA ligand linker, including Co, 6-1, Ni, 6-2, and Cu, 6-3. The MOF materials show sharp uptakes of ammonia at low ammonia pressure, resulting in 17.95 mmol $NH_3$ per gram for 6-1, 14.68 mmol/g for 6-2, and 19.79 mmol/g for 6-3. The ammonia uptake for MOFs with the larger ligand linker BTDD, specifically 12.02 mmol/g for Co 6-4, 12 mmol/g for Ni 6-5, and 15.67

I water isotherm. The stepwise isotherms modulated by pore size in these tunable materials enables a high-efficiency cascaded double-effect AHP system using MOFs with stepwise isotherms. The small-pore, more hydrophilic materials require a greater regeneration energy, ~150° C., than the large pore BTDD materials, but the heat released from the small pore MOF when it adsorbs water can be used to regenerate the large-pore MOF when it is filled with water. In this way, a cascaded heat pump cycle using 2 beds can be realized.

In detail, a cascaded heat pump system would be set up with two adsorbent beds, bed 1 containing the small pore BBTA MOF and bed 2 containing the large pore BTDD MOF. Initially, saturated bed 1 is heated to release water to the condenser. Simultaneously, adsorption of water with the initially dry bed 2 drives evaporation at a low pressure, leading to cooling in the evaporator. In the second half of the cycle, adsorption in bed 1 leads to cooling in the evaporator, meanwhile, the released heat from bed 1 desorbs bed 2, requiring no additional energy for desorption.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A metal organic framework (MOF), comprising:
   a plurality of metal ions;
   a plurality of ligands comprising two unsaturated N-heterocyclic aromatic groups;
   a plurality of auxiliary ligands; and
   an adsorbed compound,
   wherein the MOF has a crystalline structure with hexagonal symmetry comprising helices of metal ions, wherein each metal ion in the helices is associated with three ligands comprising two unsaturated N-heterocyclic aromatic groups and at least two auxiliary ligands, each of which bridge between two metal ions, the two metal ions being the same or different for each bridging ligand,
   wherein the MOF comprises pores with an average pore diameter of greater than or equal to 20 Angstroms, and
   wherein the adsorbed compound is selected from the group consisting of ammonia, water, and a halogen.

2. The MOF of claim 1, wherein the adsorbed compound is ammonia.

3. The MOF of claim 1, wherein the adsorbed compound is water.

4. The MOF of claim 1, wherein the adsorbed compound is a halogen.

5. The MOF of claim 1, wherein the plurality of metal ions comprise $Ni^{2+}$ and/or $Co^{2+}$.

6. The MOF of claim 5, wherein the plurality of metal ions comprise $Ni^{2+}$.

7. The MOF of claim 5, wherein the plurality of metal ions comprise $Co^{2+}$.

8. The MOF of claim 1, wherein the MOF in synthesized in presence of an acid.

9. The MOF of claim 1, wherein the pores comprise hexagonal symmetry.

10. The MOF of claim 1, wherein the N-heterocyclic aromatic groups are triazole groups.

11. The MOF of claim 1, wherein the pores have an average pore diameter of less than or equal to 25 Angstroms.

* * * * *